Sept. 2, 1952          E. G. ARELT          2,608,738
MACHINE FOR FINISHING ARTICLES OF POTTERY WARE
Filed Jan. 20, 1950          21 Sheets-Sheet 1
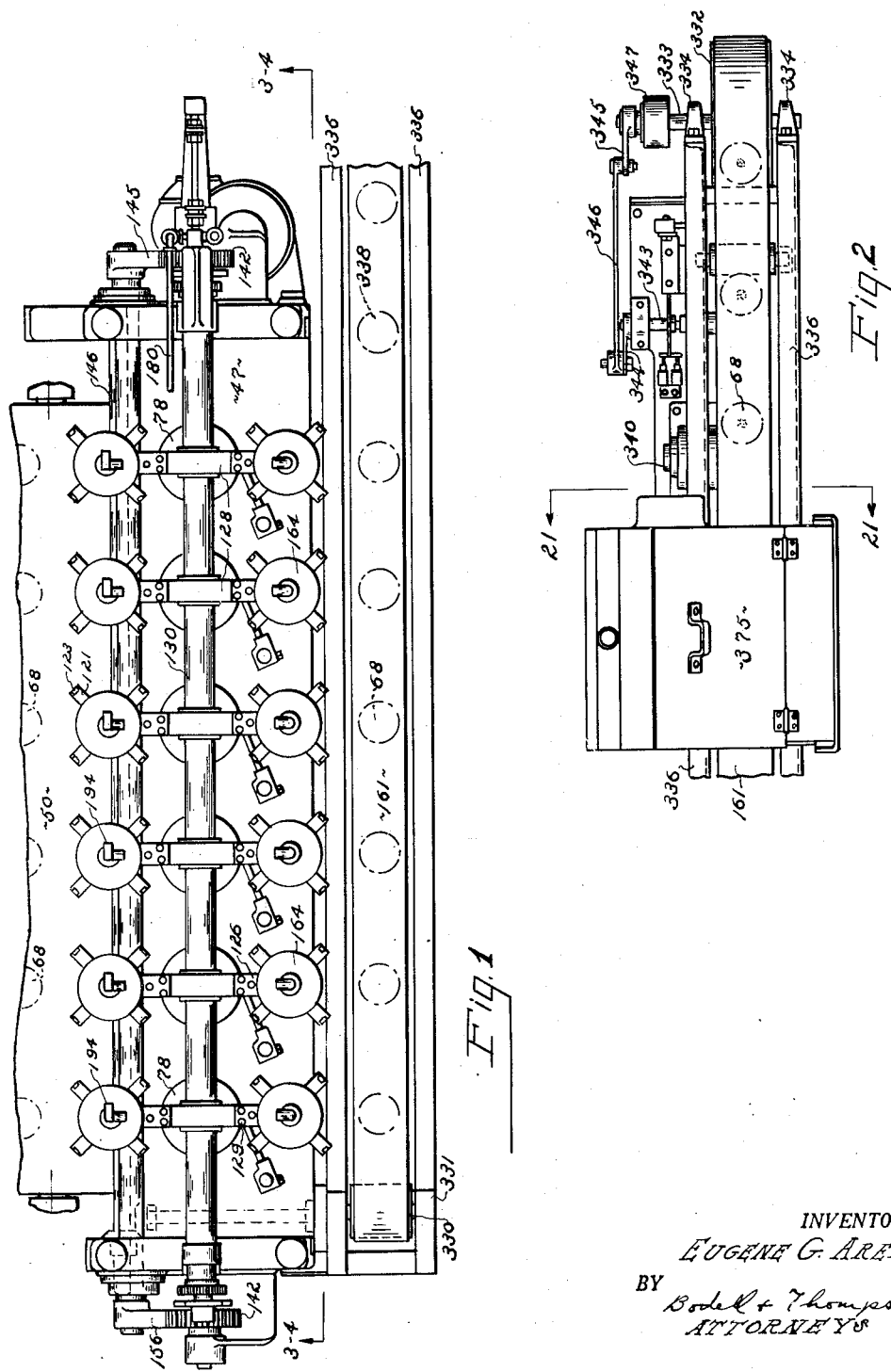
INVENTOR.
EUGENE G. ARELT
BY Bodell & Thompson
ATTORNEYS

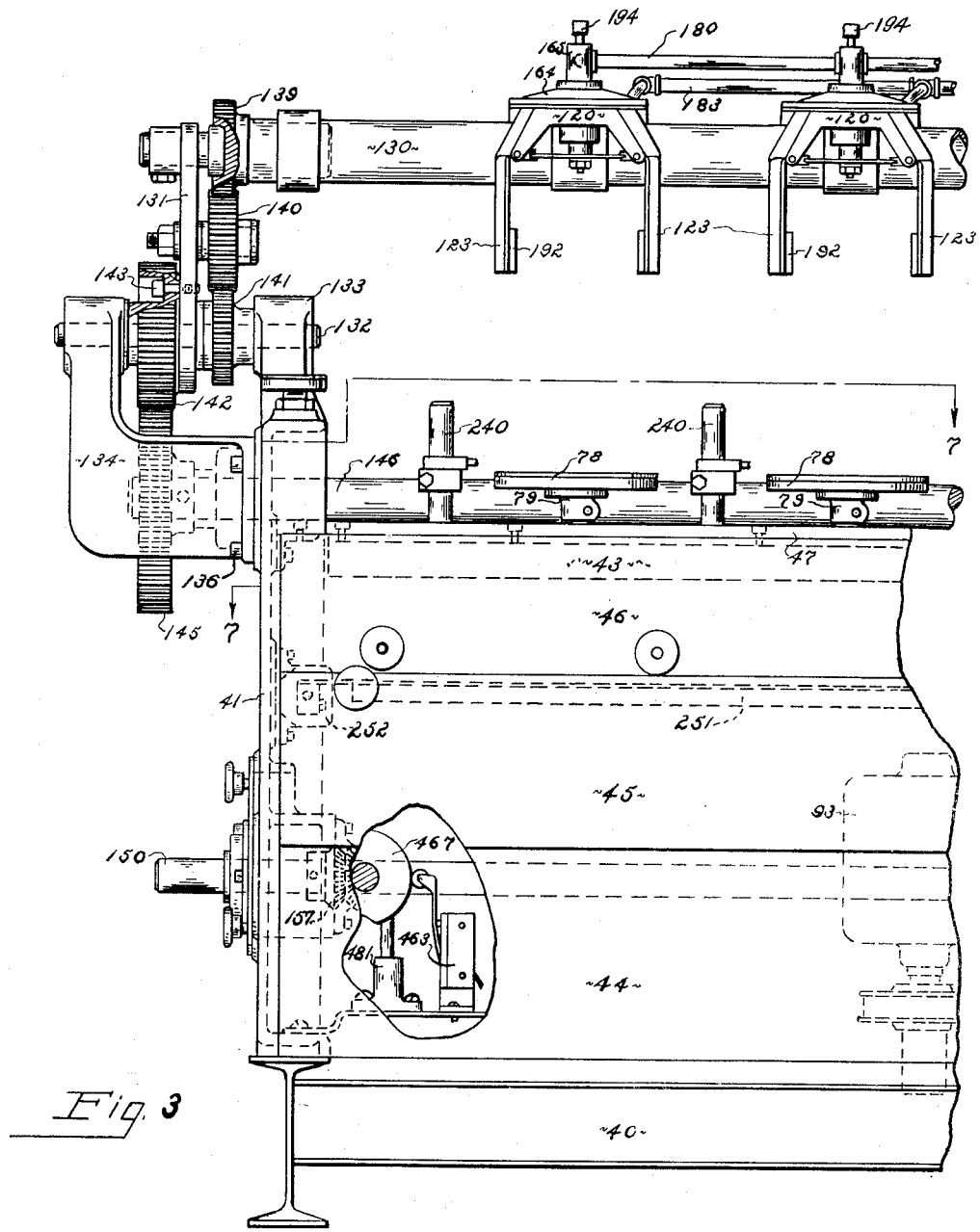

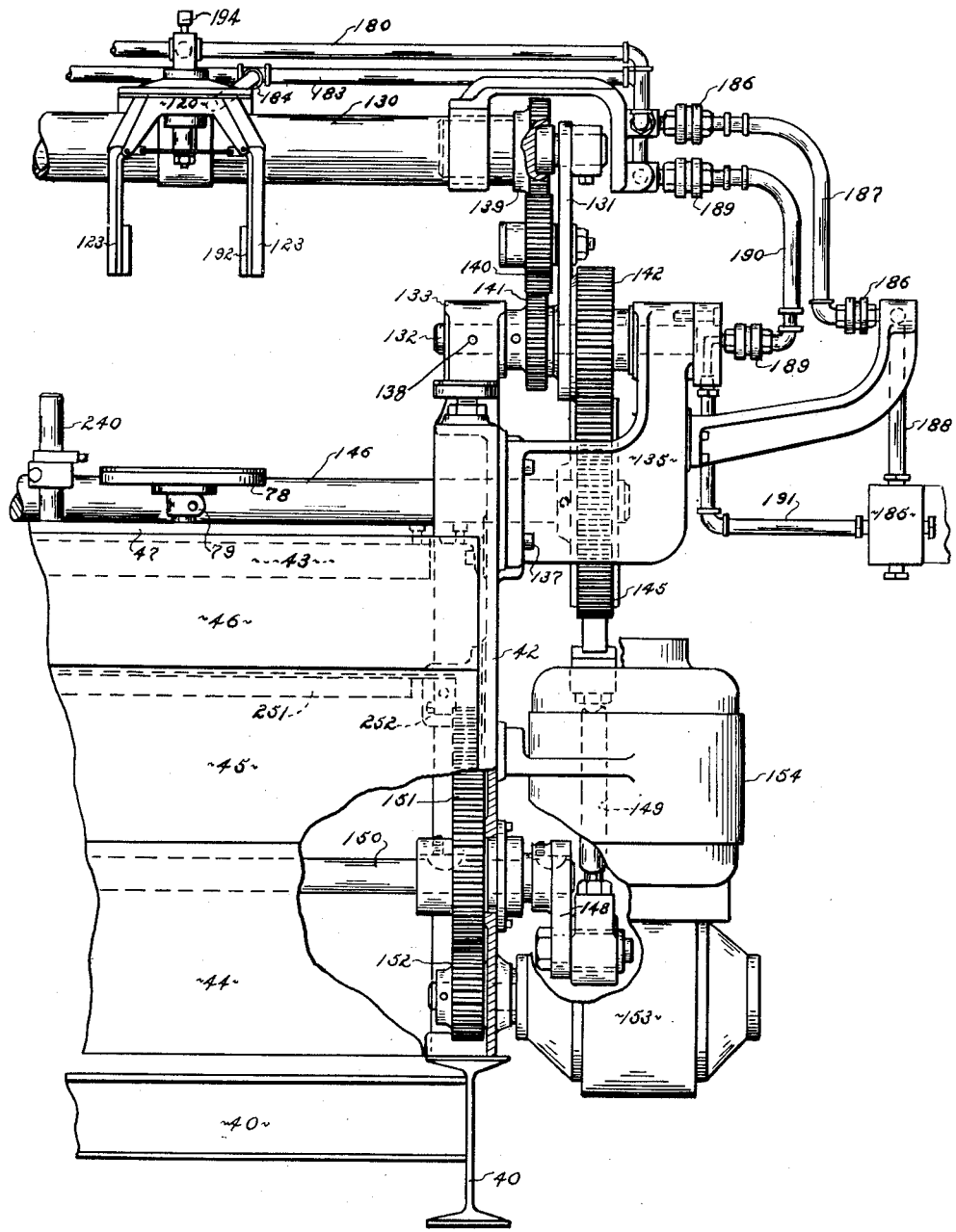

Sept. 2, 1952 E. G. ARELT 2,608,738
MACHINE FOR FINISHING ARTICLES OF POTTERY WARE
Filed Jan. 20, 1950 21 Sheets-Sheet 4

INVENTOR.
EUGENE G. ARELT
BY Bodell + Thompson
ATTORNEYS

Sept. 2, 1952        E. G. ARELT        2,608,738
MACHINE FOR FINISHING ARTICLES OF POTTERY WARE
Filed Jan. 20, 1950        21 Sheets-Sheet 5

INVENTOR.
EUGENE G. ARELT
BY Bodell + Thompson
ATTORNEYS

Sept. 2, 1952            E. G. ARELT            2,608,738
MACHINE FOR FINISHING ARTICLES OF POTTERY WARE
Filed Jan. 20, 1950            21 Sheets-Sheet 6
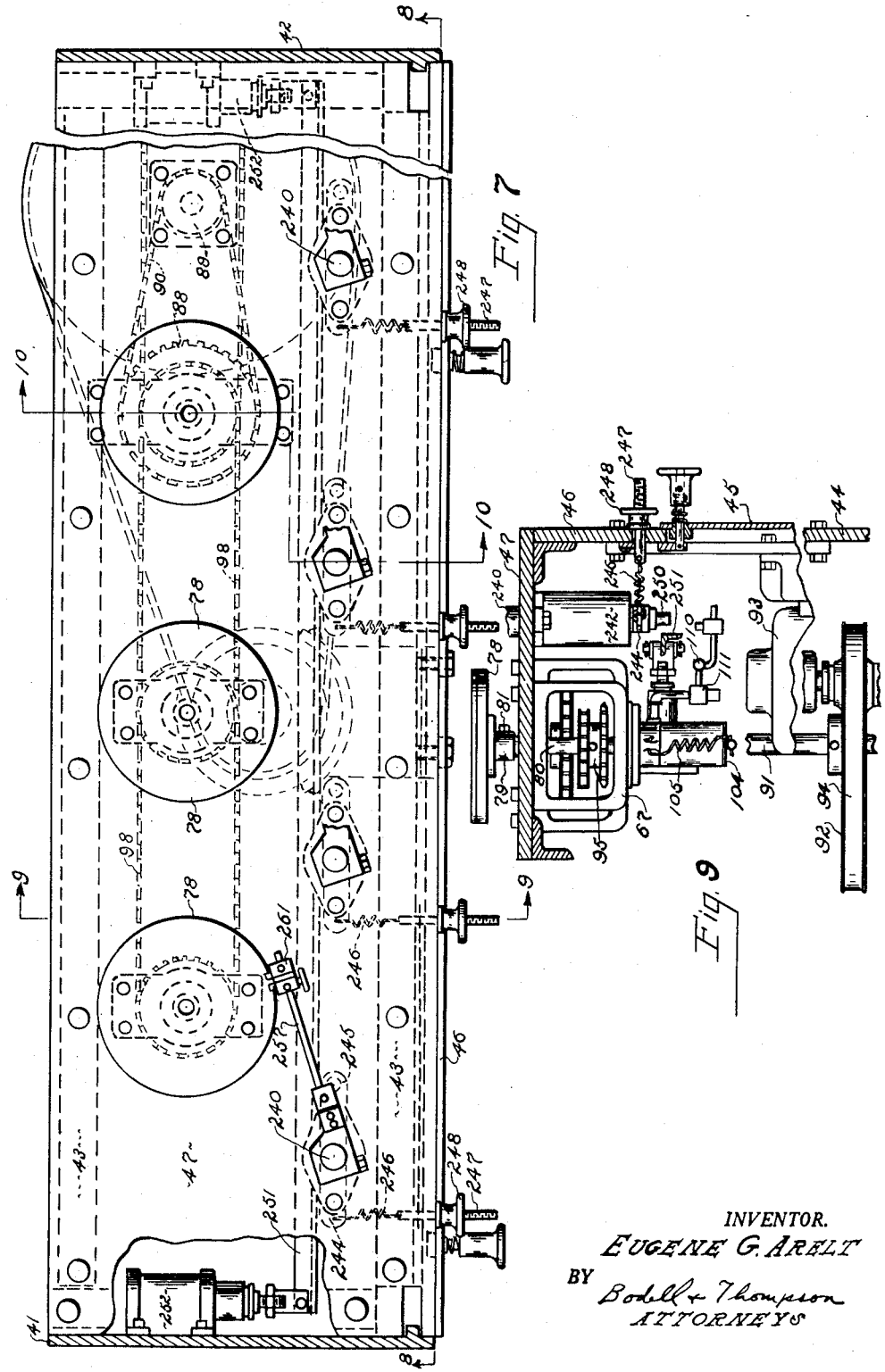
INVENTOR.
EUGENE G. ARELT
BY Bodell + Thompson
ATTORNEYS Sept. 2, 1952  E. G. ARELT  2,608,738
MACHINE FOR FINISHING ARTICLES OF POTTERY WARE
Filed Jan. 20, 1950  21 Sheets-Sheet 7
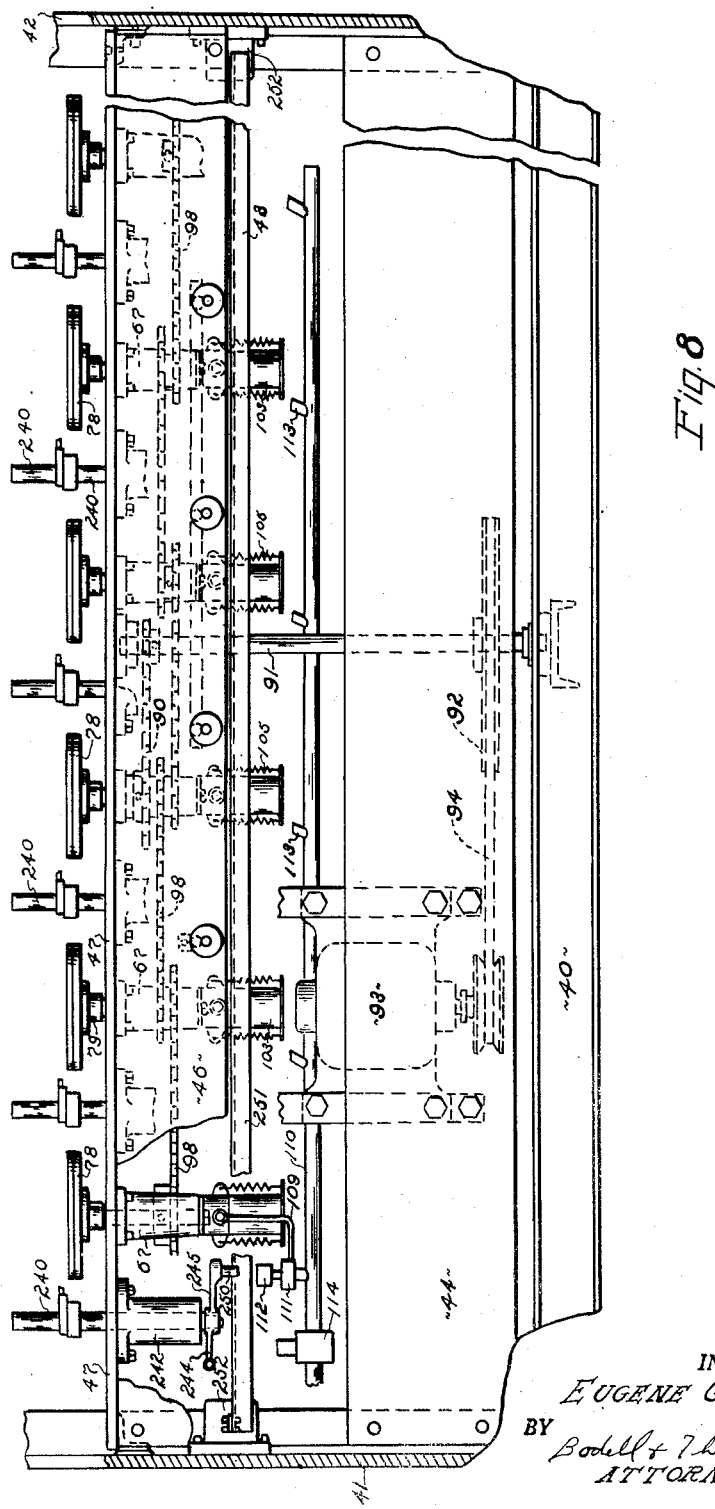
INVENTOR.
EUGENE G. ARELT
BY Bodell & Thompson
ATTORNEYS

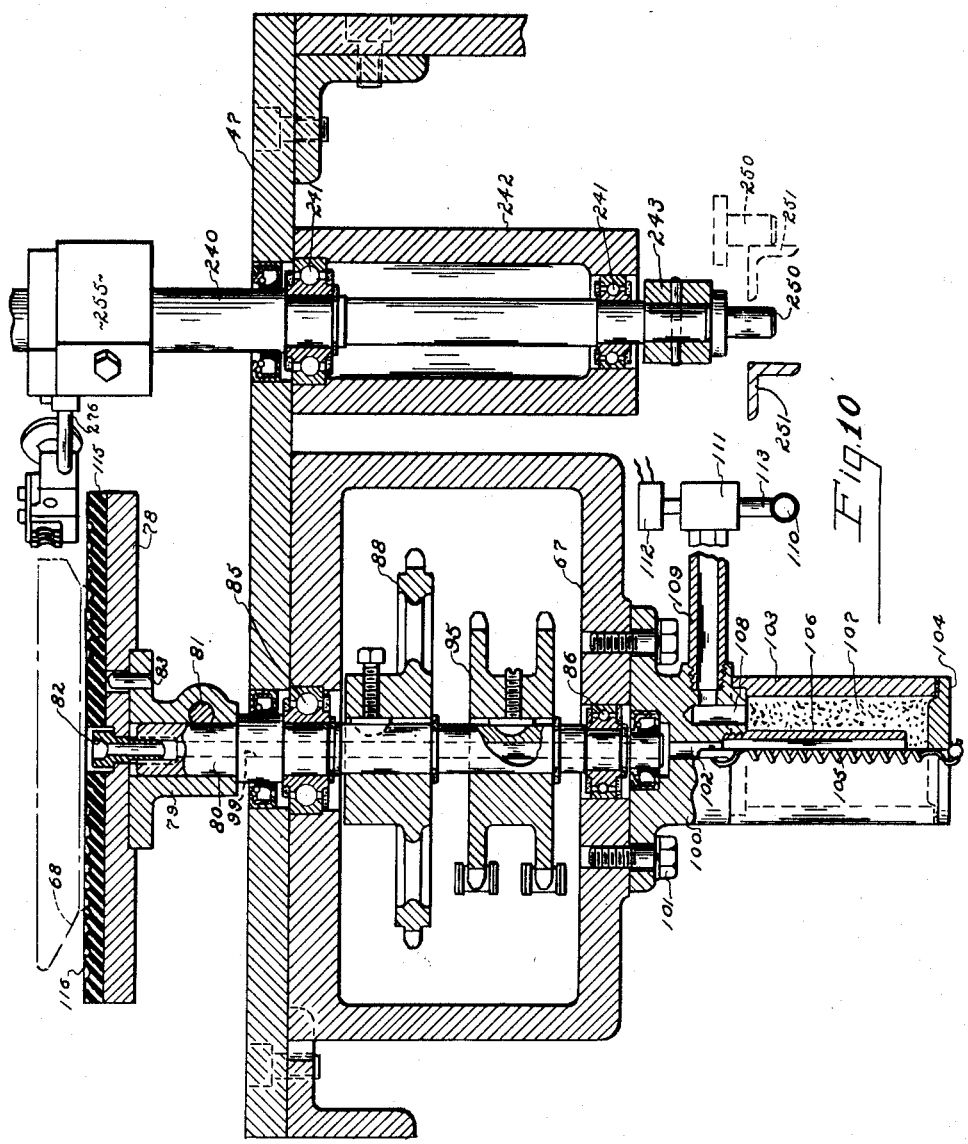

Sept. 2, 1952  E. G. ARELT  2,608,738
MACHINE FOR FINISHING ARTICLES OF POTTERY WARE
Filed Jan. 20, 1950  21 Sheets-Sheet 10
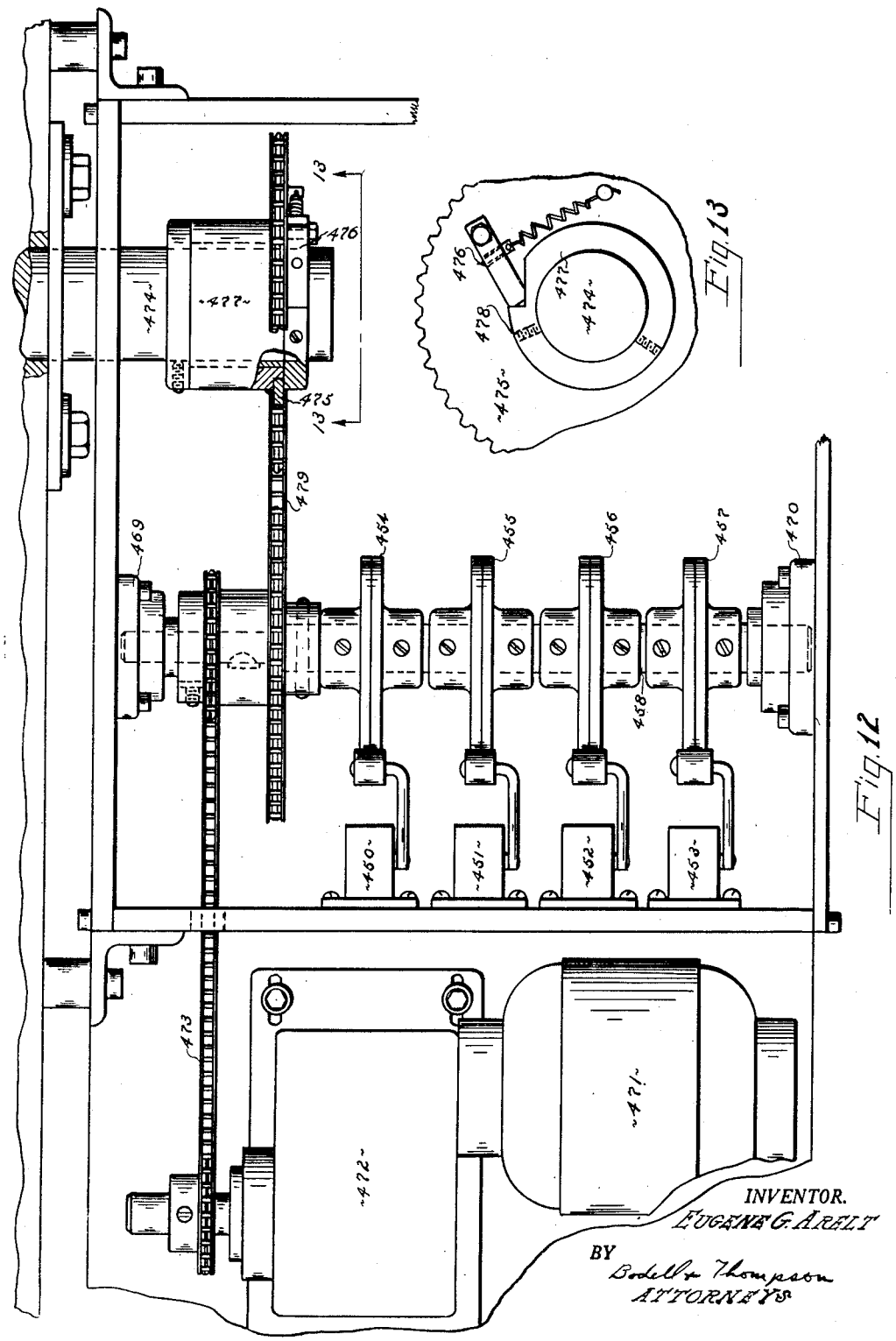
INVENTOR.
EUGENE G. ARELT
BY
Bodell & Thompson
ATTORNEYS

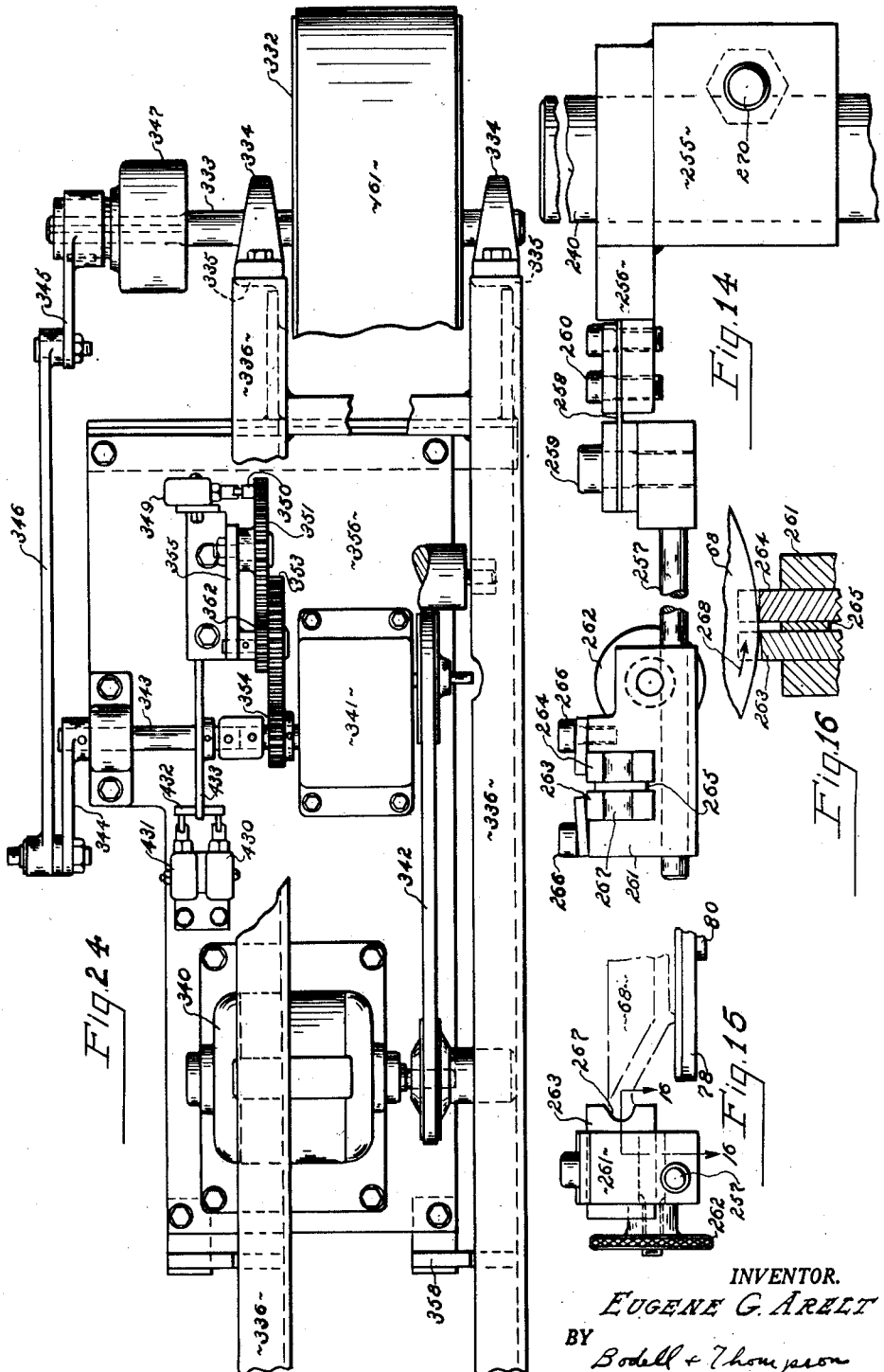

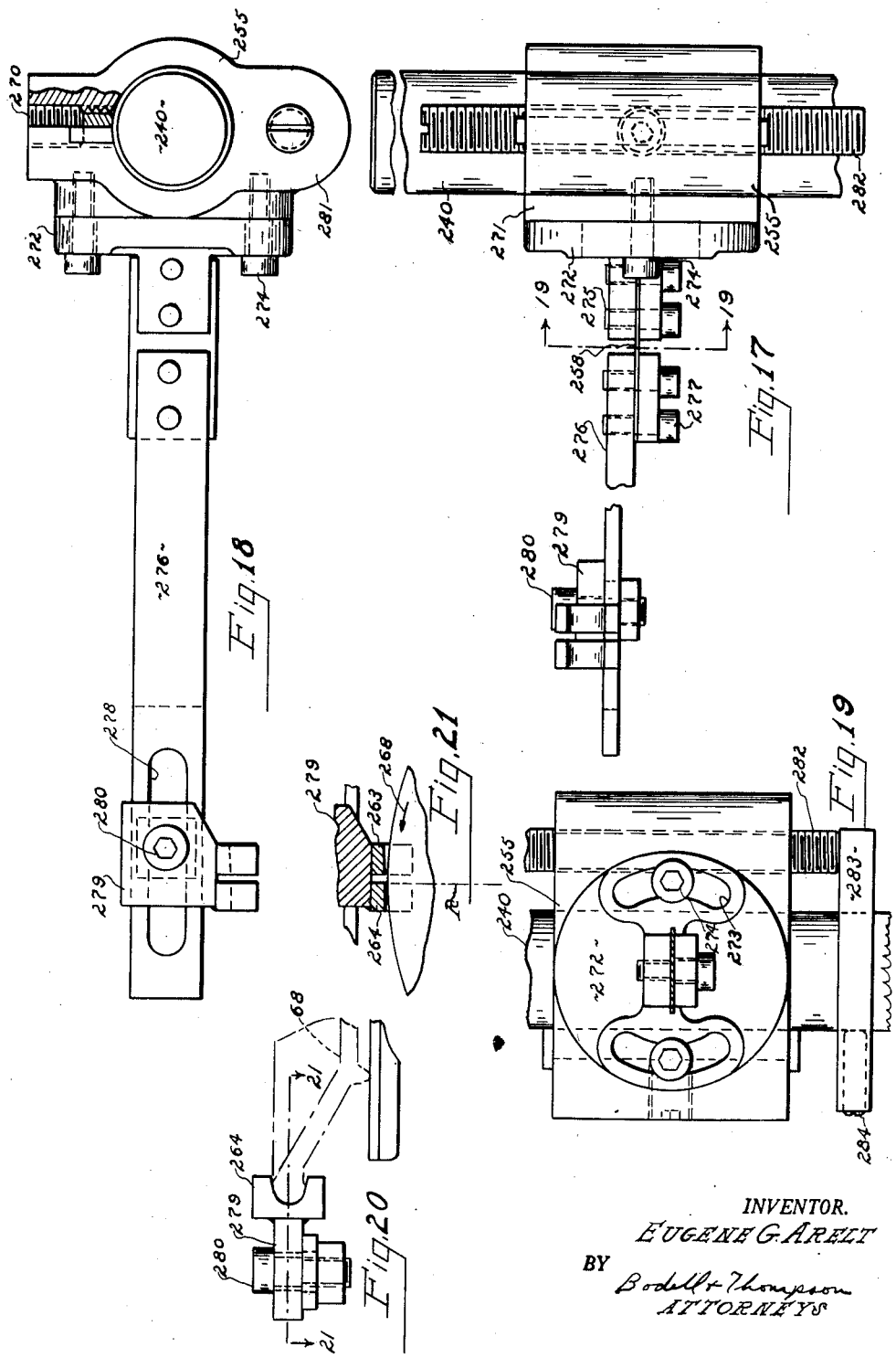

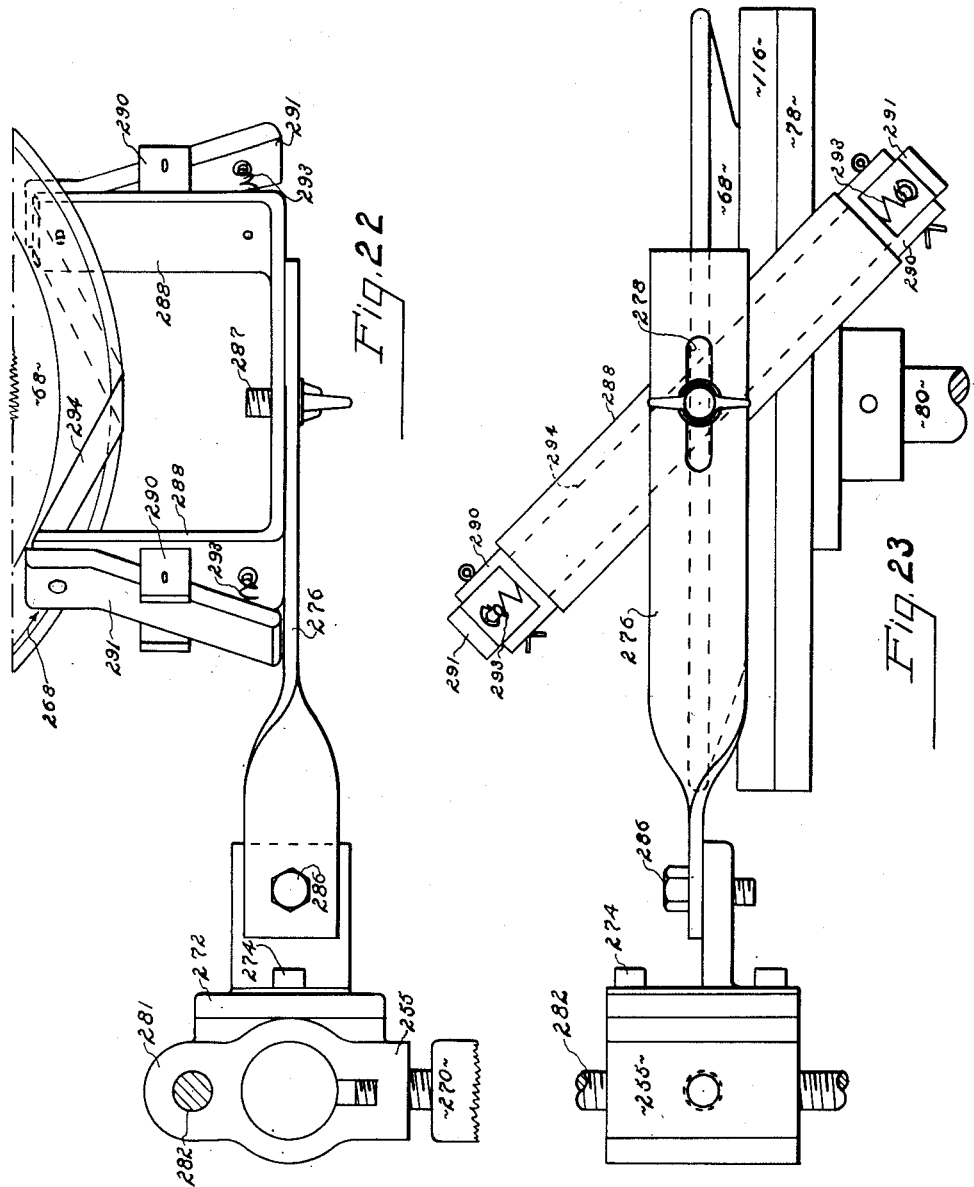

Sept. 2, 1952 E. G. ARELT 2,608,738
MACHINE FOR FINISHING ARTICLES OF POTTERY WARE
Filed Jan. 20, 1950 21 Sheets-Sheet 14

INVENTOR.
*EUGENE G. ARELT*
BY *Bodell + Thompson*
*ATTORNEYS*

Sept. 2, 1952 E. G. ARELT 2,608,738
MACHINE FOR FINISHING ARTICLES OF POTTERY WARE
Filed Jan. 20, 1950 21 Sheets-Sheet 16

INVENTOR.
EUGENE G. ARELT
BY Bodell + Thompson
ATTORNEYS

INVENTOR.
EUGENE G. ARELT
BY Bodell + Thompson
ATTORNEYS

Sept. 2, 1952  E. G. ARELT  2,608,738
MACHINE FOR FINISHING ARTICLES OF POTTERY WARE
Filed Jan. 20, 1950  21 Sheets-Sheet 18

INVENTOR.
EUGENE G. ARELT
BY Boodell + Thompson
ATTORNEYS

INVENTOR.
EUGENE G. ARELT
BY Bodell + Thompson
ATTORNEYS

Sept. 2, 1952 E. G. ARELT 2,608,738
MACHINE FOR FINISHING ARTICLES OF POTTERY WARE
Filed Jan. 20, 1950 21 Sheets-Sheet 21

INVENTOR.
EUGENE G. ARELT
BY
Bodell + Thompson
ATTORNEYS

Patented Sept. 2, 1952

2,608,738

UNITED STATES PATENT OFFICE 2,608,738

MACHINE FOR FINISHING ARTICLES OF POTTERY WARE

Eugene G. Arelt, Syracuse, N. Y., assignor to Onondaga Pottery Company, Syracuse, N. Y., a corporation of New York Application January 20, 1950, Serial No. 139,755

8 Claims. (Cl. 25—22)

This invention relates to a machine for automatically processing green, air dried, unfired, pottery ware in preparation for firing. It is customary in the manufacture of tableware to trim or fettle the edge or rim of the ware by rotating the ware, either single pieces, or a plurality of pieces, in a stack formation and while rotating the ware by hand, applying a tool by hand against the edge of the ware to remove any fringe or flashing, and to form the edge of the ware to the desired semi-circular shape for better appearance, and to also prevent chipping of the ware in service. The trimmed or fettled ware is then arranged in a pile or stack on which is known as a "setter," the function of which is to properly support the bottom piece of ware in the stack while being handled and while the ware is being fired at exceedingly high kiln temperatures in the nature of 2200° F. or higher, at which vitrifying temperature the ware softens and would distort or sag by gravity if it were not supported.

This stacking procedure is a hand operation and it consists of dusting a quantity of granulated material, such as a refractory powder having a high softening temperature on the setter and depositing a small pile of the refractory powder on the central portion of the setter. This refractory powder forms a parting medium on which the first piece of ware is placed. The deposit of the small pile of material in the center of the setter is known as a "cobbing" operation. Each piece of ware placed in the stack on the setter is similarly dusted and cobbed, except the piece of ware on the top of the pile or stack. The dusting of the small quantity of refractory powder referred to prevents the bottom plate from sticking to the setter and each superimposed piece from sticking to the piece under it in the vitrifying fire. The "cob" in the center of the setter and in the center of each piece of ware, except the top-most piece, serves as a support to prevent the center section of each piece from sagging in the vitrifying fire.

The setter, with the pile of ware so arranged thereon, is known as a "bung" and is ready to have the outer annular crevices between the edges of the ware filled with refractory material, such as sand or clay, to support the rims of the pieces of ware, and the bung is placed in the kiln and fired at the high vitrifying temperature at which, as previously stated, the ware softens and the granulated refractory material so placed between the pieces of ware supports the ware and keeps it from going out of shape.

The fettling, dusting and cobbing operations performed by hand are tedious, expensive in the use of hand labor and require elaborate exhaust system to remove the dust incident to these operations in order that the operations will not be unhealthful.

As usual, with hand operations, the amount of material in the "cob" varies with consequent variable support for the center of each piece of ware leading to slightly sagged centers of ware, or the opposite, after firing. Similarly, hand screening of the dusting material is sometimes imperfect and leads to some pieces sticking together and therefore causing marred or defective faces of the ware at the point of contact with a superimposed piece. Also, the manual operation of the tool for rounding the edge (fettling) sometimes leads to marring the edge beyond salvage and unless the tool is continued in contact with the edge for exactly the correct time, it will produce a contour quite different from the semi-circular shape.

This invention has as an object a machine which functions to automatically convey the green ware to a fettling station, automatically fettle the edge of the ware, transfer the fettled ware to a discharge conveyor and during the intermittent advancement of the ware on the latter conveyor, the machine embodies means for automatically and efficiently dusting and cobbing the ware, whereby the ware is so processed without any manual handling with subsequent breakage of the fragile ware and without the necessary expensive exhaust equipment normally necessitated when such operations are performed separately by hand. Accordingly, the machine embodying my invention brings about a substantial saving in cost and improvement in working conditions.

The invention has as a further object a machine of the type referred to having ware transfer mechanism embodying a ware gripping device capable of handling fragile air dried, green ware, without damaging the same.

The invention has as a further object a ware finishing machine employing a fettling tool which functions to properly fettle or trim the edge of the ware automatically and without knicking or breaking the fragile green ware.

The invention has as a further object mechanism for automatically dispensing a quantity of refractory material for the dusting of the ware and an accurate quantity of such material for cobbing the ware, such operations being performed automatically in timed relation to the advancement of the trimmed ware.

The invention consists in the novel features and in the combinations and constructions hereinafter set forth and claimed.

In describing this invention, reference is had to the accompanying drawings in which like characters designate corresponding parts in all the views.

Figure 1 is a top plan view of a major portion of a machine embodying my invention.

Figure 2 is a top plan view of the portion of the machine immediately to the right of that shown in Figure 1.

Figure 3 is a side elevational view of the left hand portion of the machine shown in Figure 1 looking upwardly and with the discharge conveyor omitted, as indicated by the line 3—4, 3—4.

Figure 4 is a view, similar to Figure 3, of the right hand portion of the structure shown in Figure 1.

Figure 7 is a top plan view of the machine cabinet taken on a line corresponding to line 7—7, Figure 3, and with parts broken away.

Figure 8 is a side elevational view of the cabinet portion of the machine, as shown in Figures 3 and 4, with one of the side plates thereof removed and one partially broken away.

Figure 9 is a view taken on line 9—9, Figure 7.

Figure 10 is a view taken on line 10—10, Figure 7.

Figure 12 is an elevational view of the timer cam shaft and driving mechanism for controlling the sequence of operation of the machine.

Figure 13 is a fragmentary view taken on line 13—13, Figure 12.

Figure 14 is an elevational view of a fettling tool and the supporting arm therefor.

Figure 15 is an end elevational view looking to the right, Figure 14.

Figure 16 is a fragmentary sectional view taken on line 16—16, Figure 15.

Figure 17 is a side elevational view of a modified form of fettling tool.

Figure 18 is a top plan view of the tool arrangement shown in Figure 17.

Figure 19 is a view taken on line 19—19, Figure 17.

Figure 20 is an end elevational view of the tool shown in Figures 17 and 18.

Figure 21 is a view taken on line 21—21, Figure 20.

Figure 22 is a top plan view of a further modified form of fettling tool.

Figure 23 is a side elevational view of the tool shown in Figure 22.

Figure 24 is a plan view of the driving or actuating mechanism for the discharge conveyor.

Figure 5:
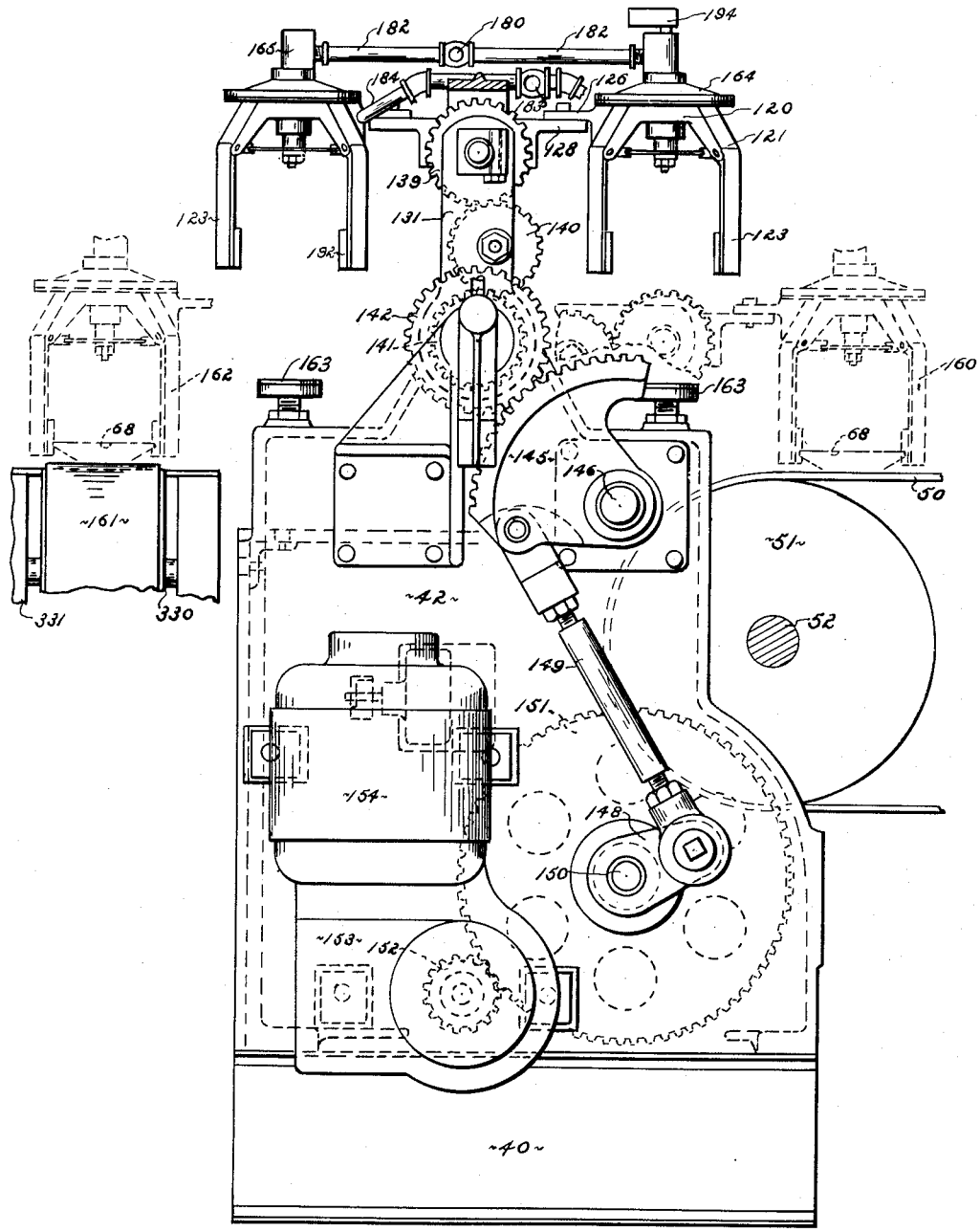
Figure 5 is an end elevational view of the structure shown in Figure 1, looking to the left of that figure.

The machine consists generally of an in-feed conveyor, a discharge conveyor, and a plurality of vertically journalled ware rotating spindles arranged intermediate the conveyors.

The machine further includes ware transfer mechanism which operates to simultaneously transfer a plurality of pieces of ware from the in-feed conveyor to the fettling spindles and at the conclusion of the fettling operation to transfer the fettled ware to the discharge conveyor. The discharge conveyor is actuated intermittently to advance a procession of fettled pieces of ware to and past a dusting and cobbing station and at that station there is arranged mechanism for automatically dusting and cobbing each piece of ware.

The machine proper includes a frame structure mounted upon a base structure formed of I beams 40. The ends of the framework consists of plates 41, 42, extending upwardly from the base and connected by lengthwise extending members 43 secured at their ends to the plates 41, 42. The sides of the frame are covered with suitable plates 44, 45, 46, whereby the frame has the exterior appearance of a rectangular cabinet closed by a top plate 47.

Figure 26:
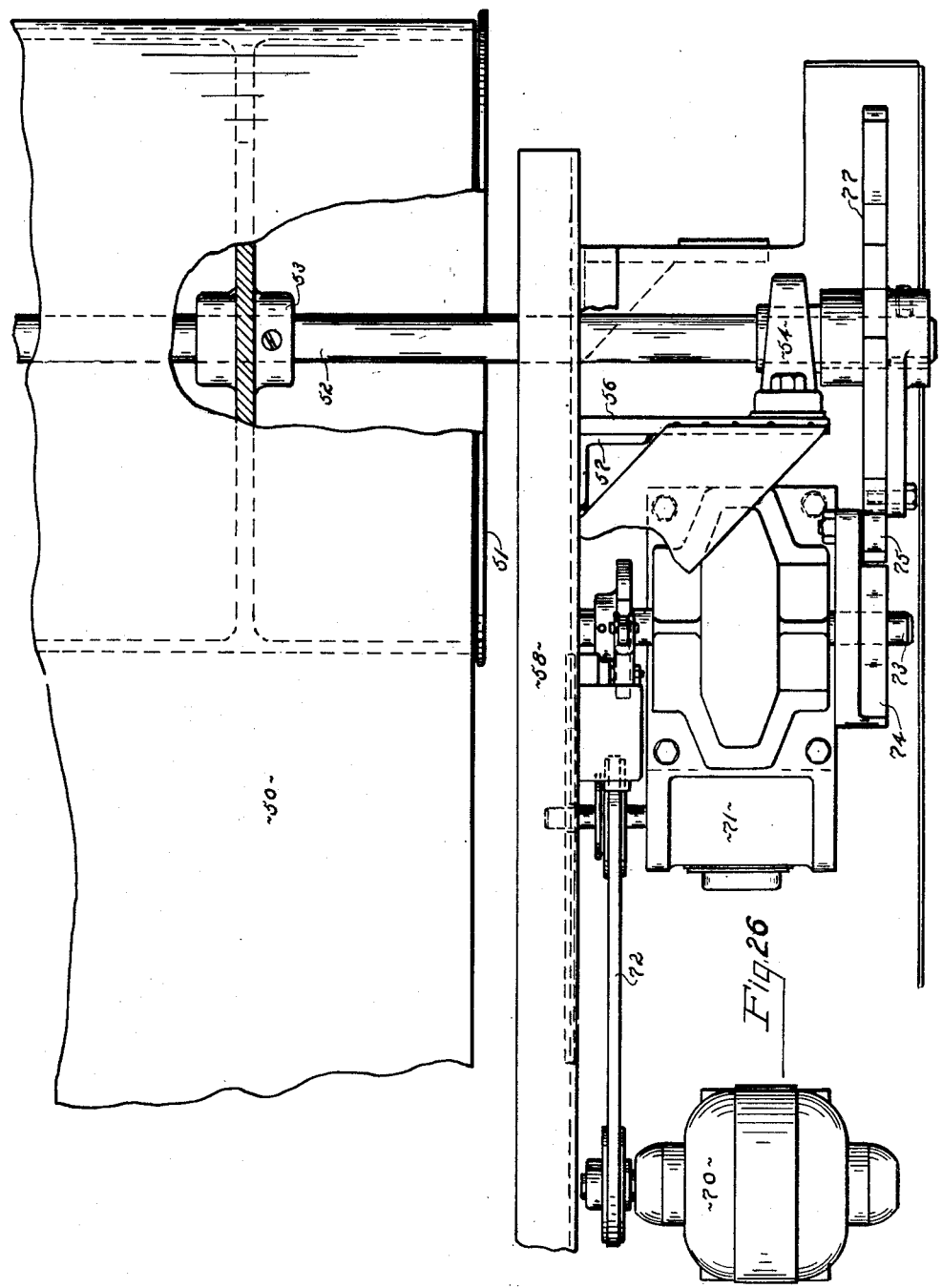
Figure 26 is a plan view of the actuating or driving mechanism for the in-feed conveyor.

An in-feed conveyor is mounted on one side of the cabinet. This conveyor is in the form of a wide belt 50 extending the major portion of the length of the cabinet and being trained over a driving roll 51, Figures 5 and 26, affixed to a shaft 52 as by set screws 53 positioned in the hubs of the webs of the roll. The shaft 52 is journalled at each end in a bearing 54, one of which is shown in Figure 26. The bearings 54 is mounted upon a plate 56 secured to an upright 57 forming part of the conveyor frame. The opposite end of the shaft is journalled in a similar structure, not shown, and the frame includes a horizontal member 58 extending along each side of the conveyor, these members being supported at their outer ends on uprights 59, Figures 28 and 29.

Figure 28:
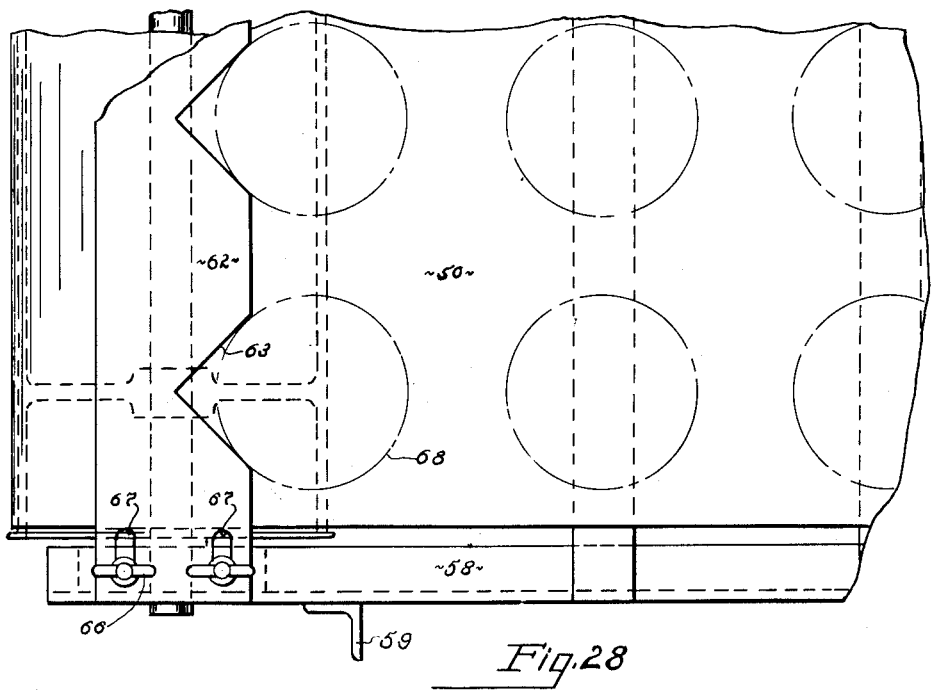
Figure 28 is a top plan view of the opposite end of the conveyor structure shown in Figure 26.
Figure 29:
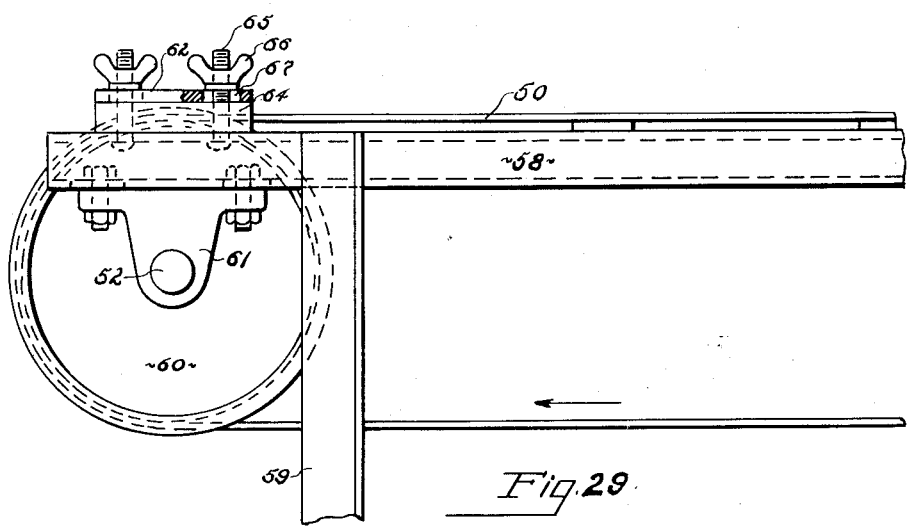
Figure 29 is a side elevational view of the structure shown in Figure 28.

The conveyor belt 50 is also trained over a roll 60 journalled in bearings 61 secured to the outer ends of the members 58, see Figures 28 and 29. A positioning guide or jig is arranged at the outer end of the conveyor and consists of a plate 62 extending transversely across the belt 50 and being formed with notches 63. The plate 62 is mounted on blocks 64 secured to the side rail members 58 as by bolts 65 and wing nut 66. The plate 62 is formed with elongated apertures 67 to provide adjustment of the plate transversely of the belt. The pieces of ware, indicated in dotted outline at 68, Figure 28, are initially positioned on the belt in the V notches 63 to aline the pieces in a row in a predetermined position on the belt. As the upper run of the belt is advanced toward the cabinet of the machine, this row of ware will arrive at the cabinet in position to be engaged by the ware transfer mechanism.

Figure 27:
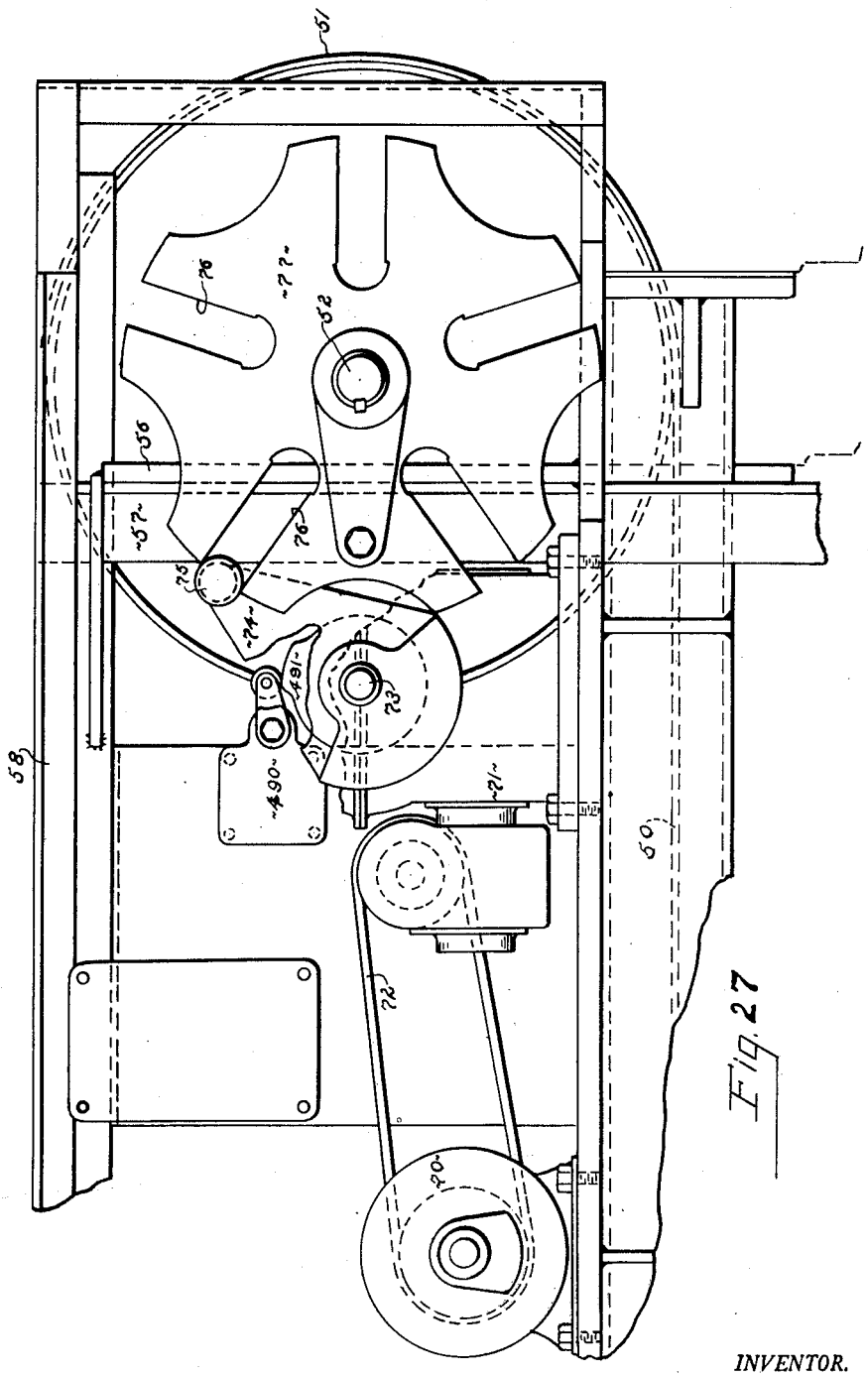
Figure 27 is a side elevational view of the driving mechanism shown in Figure 26.

The upper run of the conveyor belt 50, with the rows of ware thereon, is intermittently advanced towards the cabinet by a motor 70 connected to a gear reducing unit 71 by means of a belt 72, see Figures 26, 27. The output shaft 73 of the reduction unit has affixed thereto a Geneva crank 74, the roller 75 of which engages slots 76 of a Geneva disk 77 mounted upon the shaft 52. This in-put conveyor accordingly functions to intermittently advance rows of yare toward, and in juxtaposition to, the cabinet containing the ware transfer and trimming mechanism. As shown in the drawings, the arrangement is constructed to handle a row of six pieces of ware and there are accordingly six transfer members for transferring the six pieces of ware in each row to the pads or turn tables 78, Figure 10, by which the pieces of ware are rotated for the fettling operation.

The turn tables 78 are positioned on hub members 79 adjustably fixed to spindles 80 as by means of clamping screws 81, see Figure 10. The turn table plates 78 are clamped against the flange of the hub 79 by a hollow screw 82 threading into the end of the spindle and rotation of the hub is transmitted to the turn table by a dowel pin 83.

The spindles 80 are journalled vertically in bearings 85, 86 mounted in box shaped supports 67 secured to the under side of the top plate 47 of the machine cabinet. One of the spindles 80 has affixed to it a sprocket 88—for example, the third spindle from the left, Figures 7 and 8, and this sprocket is connected to a sprocket 89 by a chain 90. The sprocket 89 is fixed to the upper end of a shaft 91 journalled vertically in the cabinet and which carries at its lower end a pulley 92 connected to a driving motor 93 by a belt 94. This turn table spindle 80, together with the one positioned on the left thereof, Figure 8, and the two positioned on the right thereof, carry double sprockets 95. The two spindles on the ends of the machine, Figure 8, are provided with single sprockets. The spindles are operatively connected together by driving chains 98. It will be apparent that this arrangement provides for rotation of all the spindles at a uniform speed by the driving motor 93.

All of the spindles are formed with an axially extending passage 99, Figure 10. A member 100 is secured to the bottom wall of each of the supporting housings 67 as by screws 101. These members are formed with an axially extending passage 102 communicating with the passage 99 extending through the spindle. A depending cylindrical sleeve 103 is secured to each of the members 100 and is provided with a bottom closure 104 detachably secured thereto as by tension springs 105. A pipe 106 forms an extension of the passage 102 and terminates in proximity to the closure 104. The sleeve is filled with dust collecting material 107, such as oiled wool. The member 100 is formed with a passage 108 communicating with a pipe 109 which is connected to a header 110 through a valve 111 operated by a solenoid 112 and a pipe 113. The header 110 is connected to a vacuum pump through a main solenoid operated valve 114, Figure 8. The valve 114 and the individual valves 111 are opened to apply vacuum through the spindles 80 to fixedly secure the pieces of ware 68 to the turn table so that the pieces of ware will be rotated for the trimming or fettling operation.

A disk 115, Figure 10, of resilient material, such as rubber, is secured to the upper surface of each of the turn tables 78 and is preferably formed with a plurality of concentric grooves 116 to aid in fixedly securing the pieces of ware to the turn table by the vacuum means.

The pieces of ware 68, here shown in the form of flatware such as dinner plates, are transferred from the in-feed conveyor belt 50 to the turn tables 78 by apparatus disclosed in Figures 3, 4, 5, 6 and 11. This apparatus consists of a pair of ware gripping members for each piece of ware. The gripper members consist of a circular member 120, Figure 11, having four depending arms 121, each of which is bifurcated at its lower end to receive a ware gripping finger having a depending arm 123 and an inwardly extending arm 124. These fingers are pivotally mounted on the arms 121 as by pivot pins 125. Each of the members 120 is formed with a radially extending bracket 126 which are secured to the ends of supporting members 128 as by screws 129. These members 128 are fixed intermediate their ends to a tubular shaft 130, Figure 4, which extends lengthwise of the machine and is journalled at its ends in brackets 131 which, in turn, are journalled at their lower ends on shafts 132. The shafts 132 are mounted at their inner ends in bearings 133 and at their outer ends in brackets 134, 135. The bearings 133 are mounted on the upper ends of the end plates 41, 42, of the cabinet frame. The bracket 134 is attached to the end plate 41 as by screws 136 and the bracket 135 is attached to the end plate 42 as by screws 137. A spur gear 139 is fixed to each end of the tubular shaft 130 and is arranged in mesh with an idler gear 140 journalled on the brackets 131 and meshing with a gear 141 fixed to the shafts 132. A gear 142 is journalled on the shaft 132 and is fixed to the brackets 131 as by screws 143, Figure 3. The shafts 132 are fixedly mounted in the supports 133 and restrained from rotation by pins 138.

The gears 142 are oscillated by a gear quadrant 145, Figures 4 and 5, fixed to a shaft 146 which also extends lengthwise of the cabinet and is journalled at its ends in the end plates 41, 42. The gear quadrant 145 is connected to a crank 148 by a link 149. The crank 148 is fixedly secured to a shaft 150, Figure 4, which also extends lengthwise of the machine and is journalled in the end plates 41, 42. This shaft has affixed to it a spur gear 151 arranged in mesh with a pinion 152 on the output shaft of a gear reducer 153 driven by a motor 154, see Figure 4. With this arrangement, the shaft 146 is oscillated whereby the gear 142 is oscillated through the quadrant 145. The shaft 146 is also provided with a quadrant 156 at its opposite end to mesh with the gear 142 fixed to the bracket 131.

As the gears 142 are oscillated, the brackets 131 are also oscillated through an arc of approximately 180°. However during this oscillation of the brackets, the supporting members 128 are maintained in horizontal position through the action of the gears 139, 140 and 141, at each end of the assembly. The result is that when the transfer mechanism is moved to the right, Figure 5, one set of ware grippers is arranged in juxtaposition to the in-feed belt 50, and the other set is arranged in alinement with the turn table 78, as indicated at dotted outline 160. When the transfer mechanism is oscillated to the left, Figure 5, the ware gripping members that were previously arranged in alinement with the turn tables is shifted into juxaposition to the out-feed conveyor belt 161, as indicated in dotted outline 162, and the ware gripping members that were formerly in juxtaposition to the in-feed conveyor belt 50 are moved in registration with the turntables 78. Adjustable stop members 163 are threaded into the top of the end plates 41, 42, and serve as stops for, and which are engageable by, the transfer mechanism. These adjustable stops 163 determine the lowermost position of the transfer so that the gripping fingers 123 are accurately positioned relative to the pieces of ware on the conveyors 50—161, and on the turn tables 78.

Figure 11:
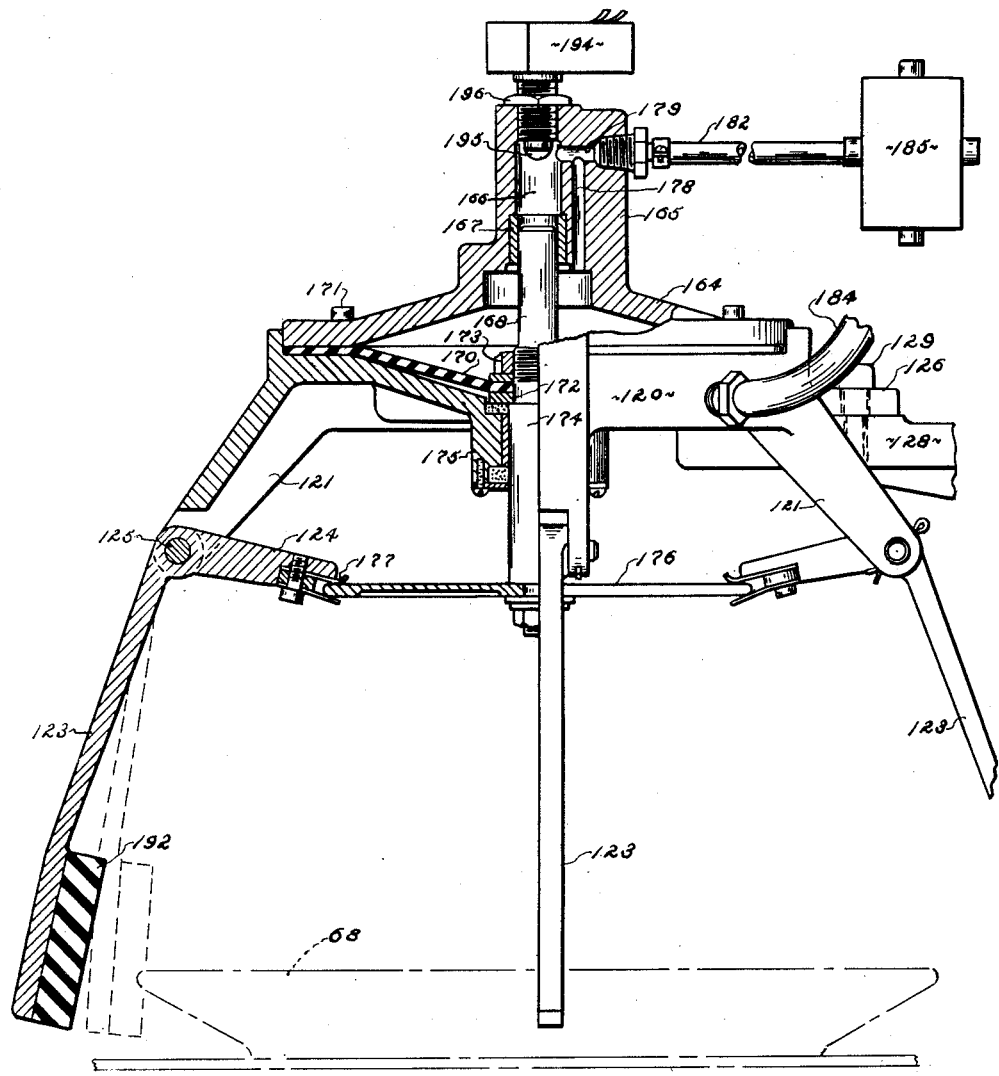
Figure 11 is a side elevational view, partly in section, of one of the ware grippers.

The detail structure of the ware gripping members is disclosed in Figure 11. The members 120 are formed with a central concavity over which is arranged a dished member 164 having a hub portion 165 formed with a central aperture 166 provided with a bushing 167 in which is slidably mounted a stem 168. The chamber formed between the members 120, 164, is partitioned by a flexible diaphragm 170, the peripheral margin of which is clamped between the members as by screws 171. The stem 168 is fixed centrally in the diaphragm by washers 172 and nut 173 threaded on the stem and acting against a shoulder formed by the lower enlarged portion 174 of the stem which is slidably mounted in a depending hub 175. The lower end of the stem has affixed to it a disk 176 and the inner ends of the arms 124 of the ware gripping fingers are provided with spaced flat spring members 177 between which the peripheral margin of the disk 176 is positioned.

The hub 165 is formed with a vertical passage 178 which communicates with a transversely extending passage 179 opening at one end into the bore 166 and being connected at its opposite end to a supply pipe 180, Figure 5, through a conduit 182. That portion of the chamber below the diaphragm 170 is connected to a supply pipe 183, Figure 4, through conduits 184. The supply pipes 180, 183, extend parallel above the shaft 130, the supply pipe 180 being connected to a valve 185 through rotary couplings 186, flexible conduits 187, 188. The supply pipe 183 is likewise connected to the valve 185 through couplings 189 and flexible pipes 190, 191.

The purpose of this arrangement is to apply pressure on either the upper or lower sides of the diaphragm 170. When pressure is applied on the upper side of the diaphragm through the supply pipe 180, the stem 168 and disk 176 is moved downwardly causing the arms 123 to move outwardly.

When pressure is applied through the pipe 183 to the under side of the diaphragm, the stem is moved upwardly and the fingers 123 moved inwardly. The lower ends of the fingers are provided with blocks 192 of soft resilient material, such as sponge rubber, so that when the fingers 123 are moved inwardly, the piece of ware 68 is gripped by the rim and as the mechanism is moved about the axis of the shafts 132, the ware is transferred from the in-feed conveyor belt 50 to the turn-tables 78 and from the turn-tables to the out-feed conveyor 161.

The solenoid operated valve 185 is controlled so as to supply fluid pressure to the top of the diaphragm as the transfer grippers are descending toward a piece of ware, or ready to move upwardly therefrom. As the grippers move over a piece of ware on the conveyor belt 50, or the turn-table 78, pressure is applied to the under side of the diaphragm, moving the fingers into engagement with the rim of the ware, and this pressure is maintained until the piece of ware has been transferred from the belt 50 to one of the turn-tables, or from one of the turn-tables to the belt 161, whereupon the pressure is exhausted and pressure applied to the upward side of the diaphragm to move the fingers out of engagement with the piece of ware.

When a piece of ware has been transferred from the belt 50 to a turn-table 78, the main vacuum valve 114, Figure 8, is opened and the valve 111 is opened to apply vacuum through the turn-table spindle 80 to hold the piece of ware on the turn-table. The motor 93 is energized, effecting rotation of the spindles and the fettling tool is moved radially inwardly to engage and trim the rim of the ware.

In the event a piece of ware is not moved to a turn-table 78, means is provided for not energizing the solenoid 112 of the valve 111 associated with that turn-table. In part, this means comprises a switch 194, Figure 11, fixed to the hub 165 of each of the transfer members and having an actuating stem 195 positioned in the upper end of the passage 66. The switch 194 is adjusted by the nut 196 so that the stem 195 will not be engaged by the stem 168 if the fingers 123 engage a piece of ware. However, if they do not engage a piece of ware or if after engaging the piece it should break, the stem 168 will move upwardly and engage the switch stem 195, opening the contacts of switch 194 which form part of the operating circuit for the individual solenoids 112, as will be hereinafter described. Accordingly, the absence of a piece of ware from one of the turn-tables 78 during the fettling operation, will not break the vacuum applied to the other turn-tables.

The edge of the pieces of ware is fettled by tools movable into engagement with the edge of the piece of ware while it is being rotated on the turn-table 78. A shaft 240, Figure 10, is arranged in juxtaposition to each of the spindles 80. These shafts 240 are journalled parallel to the spindles 80 in bearings 241 mounted in a bearing support 242 depending from the top cabinet plate 47. Each shaft has fixed to its lower end a hub 243 having arms 244, 245, Figure 8, extending radially in opposite directions from the axis of the shaft 240. A tension spring 246 is attached to the arm 244 and its opposite end to a rod 247 extending through the cabinet side plate 46. The outer portion of the rods are threaded to receive a nut 248 to adjust the tension of the springs 246. The springs tend to urge the shafts 240 in a counter-clockwise direction, Figure 7. The arms 245 are formed with a depending portion 250, Figure 10, which is engaged by a bar 251 arranged in the cabinet and extending lengthwise of the machine. The ends of the bar 251 are attained to pistons mounted in cylinders 252 secured to the inner surface of the end plates 41, 42, see Figures 8 and 10.

The shafts 240 extend upwardly through the top plate 47. A hub member 255, Figure 14, is adjustably secured to the upper end of each spindle 240. The hub members 255 are formed with radially extending projection 256 to which a stem 257 is secured. In Figures 7, 14 and 15, the stems 257 are secured at one end to a flat spring 258 as by screws 259, and the springs are attached to the radial projections 256, as by screws 260.

A tool holder 261 is apertured to receive the stem 257 and is provided with a clamping screw having a nut 262 to permit adjustment of the tool holder axially and rotatably on the stem 257. The tool holder is formed with a slot in which fettling tools 263, 264, are mounted. The tools are spaced apart by a spacer 265 and are clamped in the tool holder as by screws 266. The ends of the tools facing toward the turn-table 78 are formed with concavities 267, Figure 15, or otherwise formed complemental to the edge finish desired for the ware. The ware is rotated as indicated by the arrow 268.

After the pieces of ware have been transferred to the turn-table 78, Figure 7, and are put in rotation thereby, fluid under pressure is supplied to the cylinders 252 to cause the pistons and the bar 251 carried thereby to move inwardly and thus permitting the spindles 240 to be rotated by the springs 246, moving the fettling tool into engagement with the edge of the ware. The tool or bit 263 first removes any excessive flash or fin from the bead on the edge of the ware. The tool is yieldingly urged inwardly toward the axis of the ware by the tension springs 246. During this movement, the leading edge of the tool or tool bit 264 engages and trims or fettles the bead of the ware to a smooth uniform surface. The leading edge of the tool 264 is positioned on the radius of the ware, as indicated by the dotted line R, Figure 21. The tool 263 is spaced forwardly of this point and accordingly the trailing edge of this tool, while in line with the leading edge 264, is spaced a very slight distance outwardly from the surface of the ware. This arrangement of the tools 263, 264, is particularly advantageous in that the tool 263, because of its position, rides on the rim of the piece of ware without effecting a cutting or shaving action, and thereby serves to steady the trimming tool as a whole and prevents the tool 264 from "hogging" into the bead or rim of the ware. In this connection, it is to be kept in mind that the piece of ware is only air dried and has not been fired and accordingly is extremely fragile, and further the object of this automatic fettling or trimming is to produce a smooth uniform surface on the bead of the ware without any chatter marks, or other defects.

It will be observed, referring to Figures 16 and 21, that rotation of the piece of ware 68 in the direction of the arrow 268, the edge of the ware is finally presented to the leading edge of the tool 264 which is capable of effecting a shaving or cutting action on the bead of the ware. However, the trailing edge of the tool 263 engages the bead and simply rides on the bead without any shaving effect by automatically forming a stop for the fettling tool. In other words, the tools 263, 264, are positioned on opposite sides of the radius extending from the axis of the turn-table spindles 80.

The function of the springs 258 is to permit a slight vertical movement of the fettling tool during the rotation of the ware in the event there should be a slight warp in a piece of ware. It will be apparent that the hub members 255 may be adjusted vertically to the desired height are clamped in adjusted position by screws 270. Also, the tool holder 261 may be adjusted radially and also rotatably on the stems 257.

A modified form of tool mounting is disclosed in Figures 17 to 21. In this case, the hub member 255 is formed with a circular face 271 on which there is mounted, for adjustment about an axis perpendicular to the spindle 240, a plate 272. The plate is formed with arcuate slots 273 to receive clamping screws 274. The spring 258 is attached to the plate 272 as by screws 275, and the spring is attached to an arm 276 as by screws 277. The arm 276 is formed of a flat stock and tapers in thickness and at its outer end is formed with an elongated slot 278. The tool holder block 279 is secured to the stem by a screw 280 extending through the slot 278. In this case, the fettling tools 263, 264, are fixedly secured to the block 279.

The hub member 255 may be formed with a radial boss 281 threaded to receive an adjusting screw 282, the lower end of this screw abutting against a collar 283 mounted on the spindle 240 and secured in adjusted position by a set screw 284, Figure 19. This permits, for convenience, fine adjustment of the hubs 255 when the clamping screws 270 are loosened.

For some types of ware, the tool shown in Figures 22 and 23 is advantageous. The stem 276 is formed of flat stock secured to the plate 272 as by screw 286, and is formed at its outer end with a slot 278 to receive a clamping screw 287 which functions to clamp a U-shaped frame having legs 288 to the stem. U-shaped brackets 290 are mounted on the outer sides of the legs 288 and clamping members 291 are arranged in the brackets 290 being pivotally mounted thereto. Compression springs 293 urge the lower ends of the clamp members 291 outwardly and their upper ends inwardly to clamp the end of an abrasive band 294 against the ends of the legs 288. The band 294 is arranged to have considerable slack and the frame is adjusted on the stem so that one of the legs 288 is positioned below the plane of the turn-table 78 and the other leg above the table, whereby the abrasive band 294 is drawn or wrapped around the bead of the piece of ware and thereby conforms readily to the arcuate form of the bead of the ware.

Figure 25:
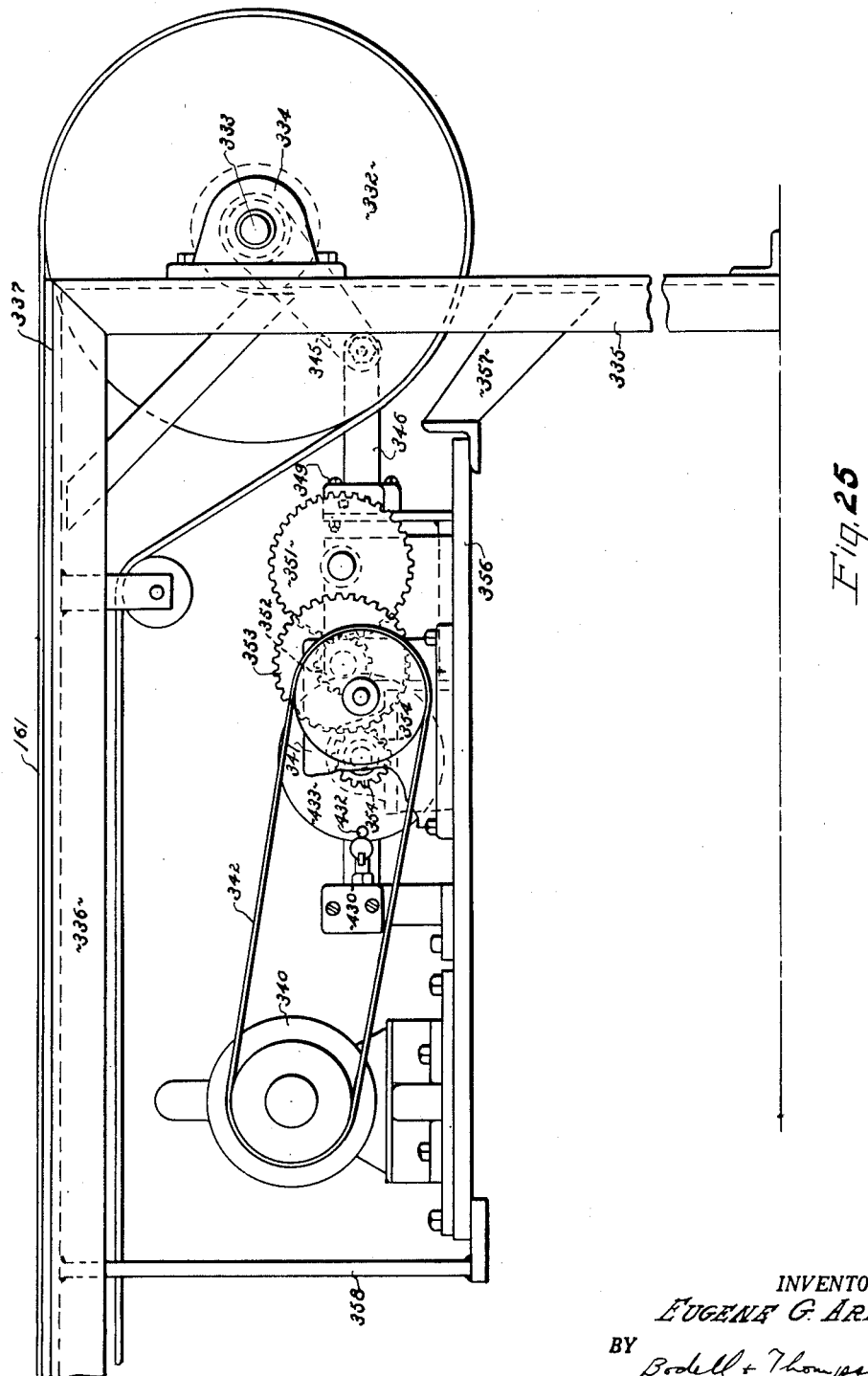
Figure 25 is a side elevational view of the drive mechanism shown in Figure 24.

When the pieces of ware 68 have been fettled, they are automatically transferred to the discharge conveyor 161, see Figure 1, as previously described. This conveyor consists of an endless belt trained over a drum 330 journalled between uprights 331 mounted on one of the base members 40 in juxtaposition to the end plate 41 of the machine cabinet. The belt is also trained over a driving drum 332, Figure 25, mounted on a shaft 333 journalled in bearings 334 mounted on uprights 335. The uprights 331 and 335 are connected at their upper ends by rails 336 extending on opposite sides of the upper run of the belt 161. A plate 337 is mounted upon the side rails 336 and forms a support for the upper run of the belt 161. This plate is omitted in Figures 1, 2 and 24, in order to better show the structure positioned below the plate. This conveyor is intermittently advanced seven times in succession during the fettling operation. As previously explained, the fettled ware is arranged in stacks preparatory to being fired in the kiln and the bottom piece of ware in each stack is positioned on a setter which consists of a piece of kiln fired refractory having the general appearance of a piece of ware.

In operation, a setter is placed upon the conveyor belt in position ahead of the six pieces of fettled ware as, for example, at the position indicated at 338, Figure 1. Upon the advancement of the conveyor, the setter is advanced under the dusting and cobbing apparatus, to be described, the setter preceding the six pieces of ware. Accordingly, the setter is dusted and cobbed the same as the pieces of ware and as the ware advances from the dusting and cobbing apparatus toward the drum 332, an operator removes the setter from the conveyor and then removes each piece of ware as the conveyor advances and stacks the pieces of ware on the setter. This is the reason for advancing the conveyor seven steps in succession rather than six steps.

The conveyor is advanced by a motor 340, Figure 24, connected to a gear reducing unit 341 by a belt 342. The output shaft 343 of the reducing unit is provided with a crank 344 connected to a crank 345 on the shaft 333 by a connecting rod 346. The crank 345 is connected to the shaft 333 through a ratchet and pawl mechanism, or over-running clutch 347. The motor 340 is initially energized by a switch controlled by the main control cam shaft. The circuit to the motor is opened by a switch 349. This switch is operated by a pin 350 carried on a gear 351 arranged in mesh with a pinion 352 which is fixedly secured to a gear 353 arranged in mesh with a pinion 354 mounted on the output shaft 343 of the gear reducing unit 341. The gears 351, 352, 353, are journalled on studs carried by a bracket 355. The motor and conveyor actuating mechanism is mounted upon a supporting plate 356, Figure 25, supported at one end by braces 357 secured to the uprights 335 and at its opposite end by bars 358 depending from the side rails 336. The gear train 351, 352, 353, 354, provide a ratio whereby the pin 350 opens the switch 349 when the shaft 343 has made seven revolutions, or the conveyor has been advanced seven steps.

During the advancement of the fettled ware by the conveyor 161, it is positioned in registration with the dusting and cobbing apparatus disclosed in Figures 30–34. This apparatus consists of a hopper 370 having a bottom wall 371 formed with an elongated slot 372 extending transversely of the belt 161 and an elliptical opening 373. The hopper is supported by uprights 374 with the bottom wall 371 positioned an appreciable distance above the conveyor. The top wall of the hopper is provided with an inclined filling door 375, Figure 31, and is filled with granulated refractory material having a relatively high softening temperature. This material passes through the opening 373 into a vertically arranged chute 377 adjustably secured to the bottom wall plate 371, as by screws 378. The material is discharged into a screen 380 mounted upon a plate 381. The screen is encircled by a cylindrical member 382 secured to the plate by angle members 383. The plate 381 is positioned on a rectangular frame 384 suspended by four spring straps 385 depending from the plate 371. The plate 381 is provided at one side with a bracket 387 to which a detent member 388 is pivoted on pin 389. The detent member is provided with a pin 390 entering an aperture in the adjacent side rail 391 of the rectangular framework 384 and is yieldingly urged in this aperture by compression spring 392, see Figure 34. The opposite side of the plate 381 is angled at its corners to abut against triangular shaped corner braces 393 of the framework 384 with that side of the plate 381 being positioned under a strap piece 394. With this arrangement, the screen can be readily removed from the framework 384 by pinching the detent 388 toward the bracket 387 against the action of the spring 392 as will be apparent.

The purpose of the screen 380 is to effect a sifting of the dusting material onto a piece of ware 68 positioned under the screen. The sifting action is effected by a plunger 398 moved into engagement with an abutment 399, Figure 33, carried by the framework 384. The plunger is actuated by a solenoid 400. The movement of the screen is limited by an abutment 401 secured to the opposite side of the framework 384 and which engages a striker plate 402 mounted on a plate 403.

The solenoid 400 is mounted upon a plate 404. The plates 403, 404, are mounted on tie rods 405, Figure 31, fixedly secured to the side rails 336 of the conveyor. The upper ends of the plates 403, 404 are secured together by a tie rod 406. With this arrangement, the sieve 380 is vibrated or jarred by the solenoid 400 and functions to sift a quantity of a powdered refractory material onto the piece of ware 68 positioned below the screen.

Figure 31:
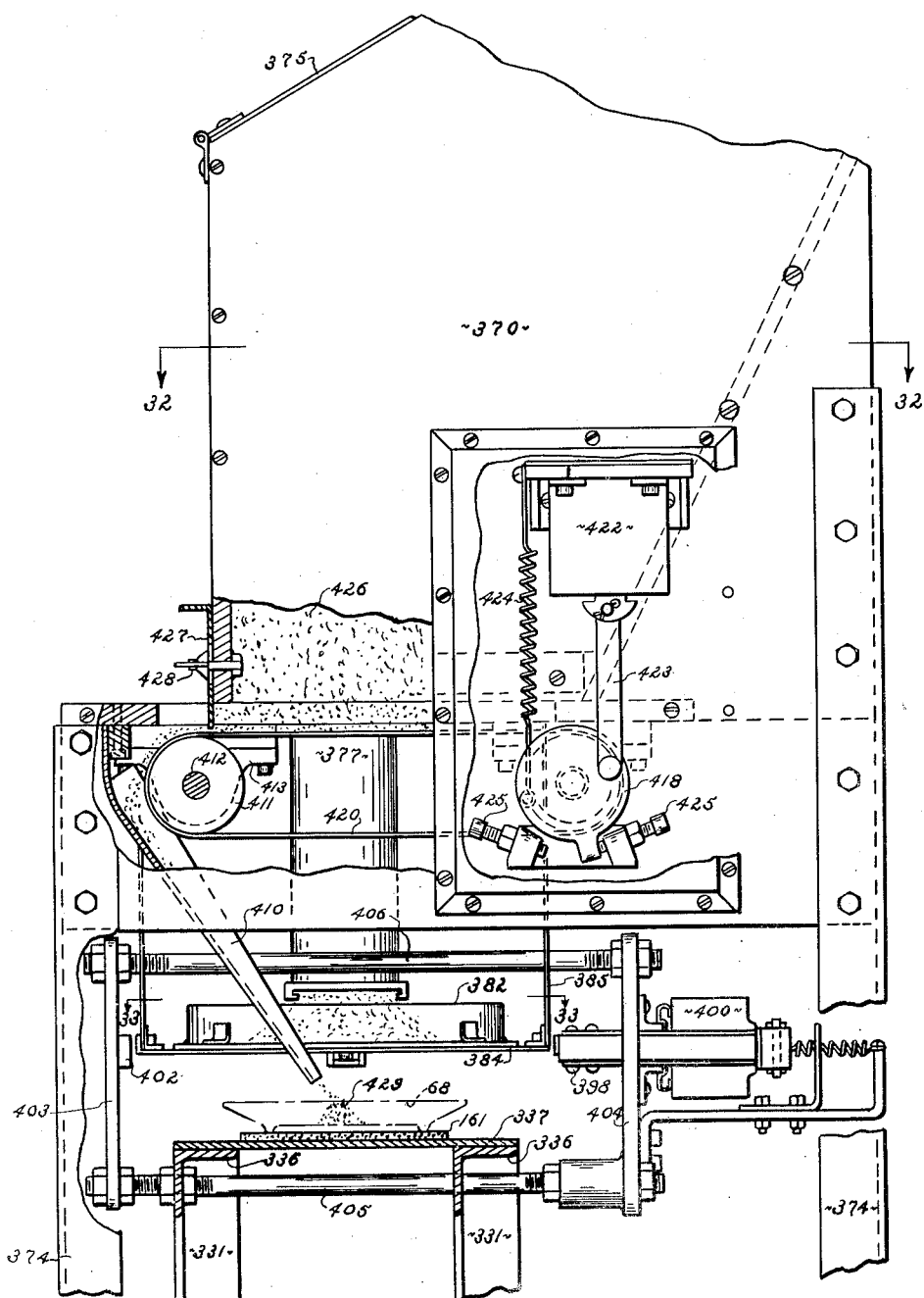
Figure 31 is an end elevational view looking to the left, Figure 30, with parts broken away and parts in section.
Figure 32:
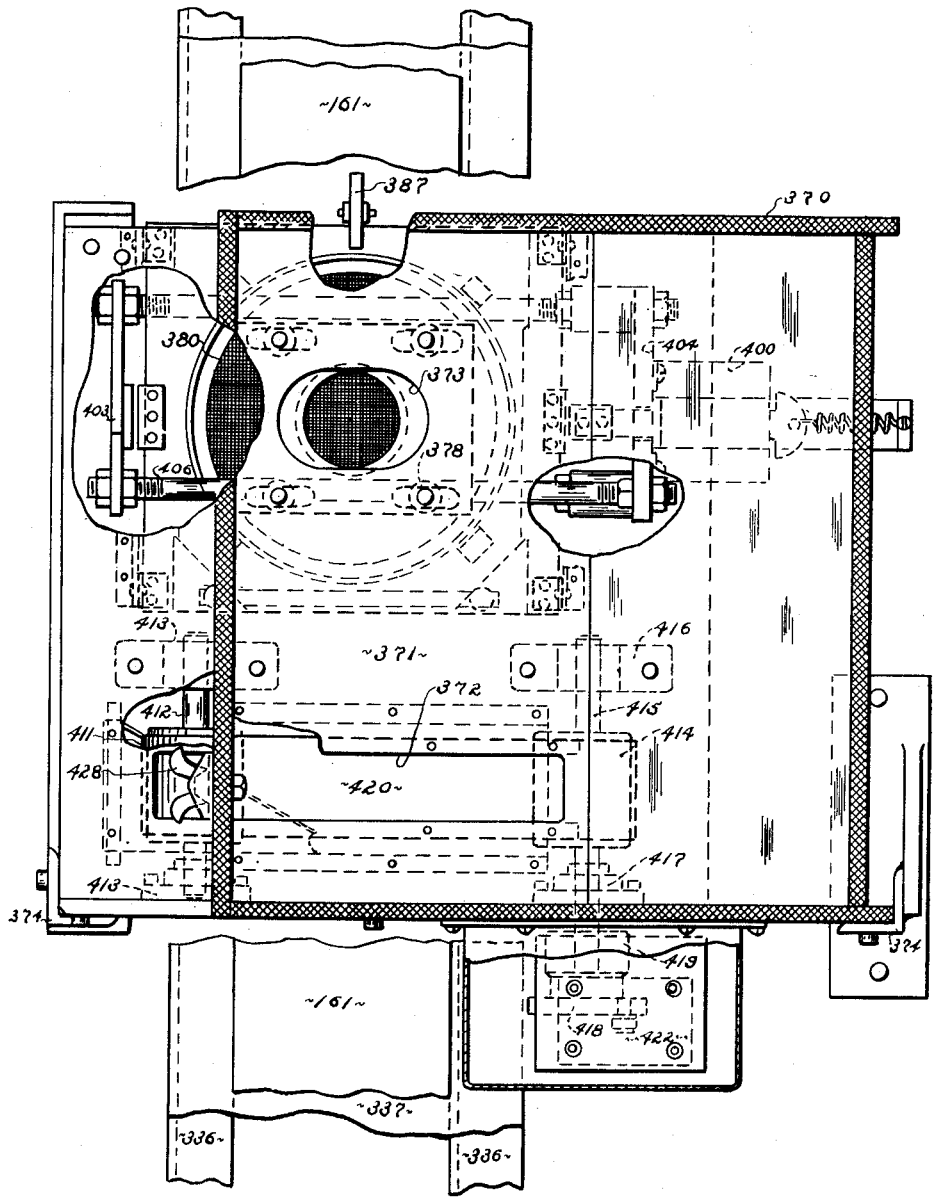
Figure 32 is a view taken on line 32—32, Figure 31, with parts broken away.
Figure 33:
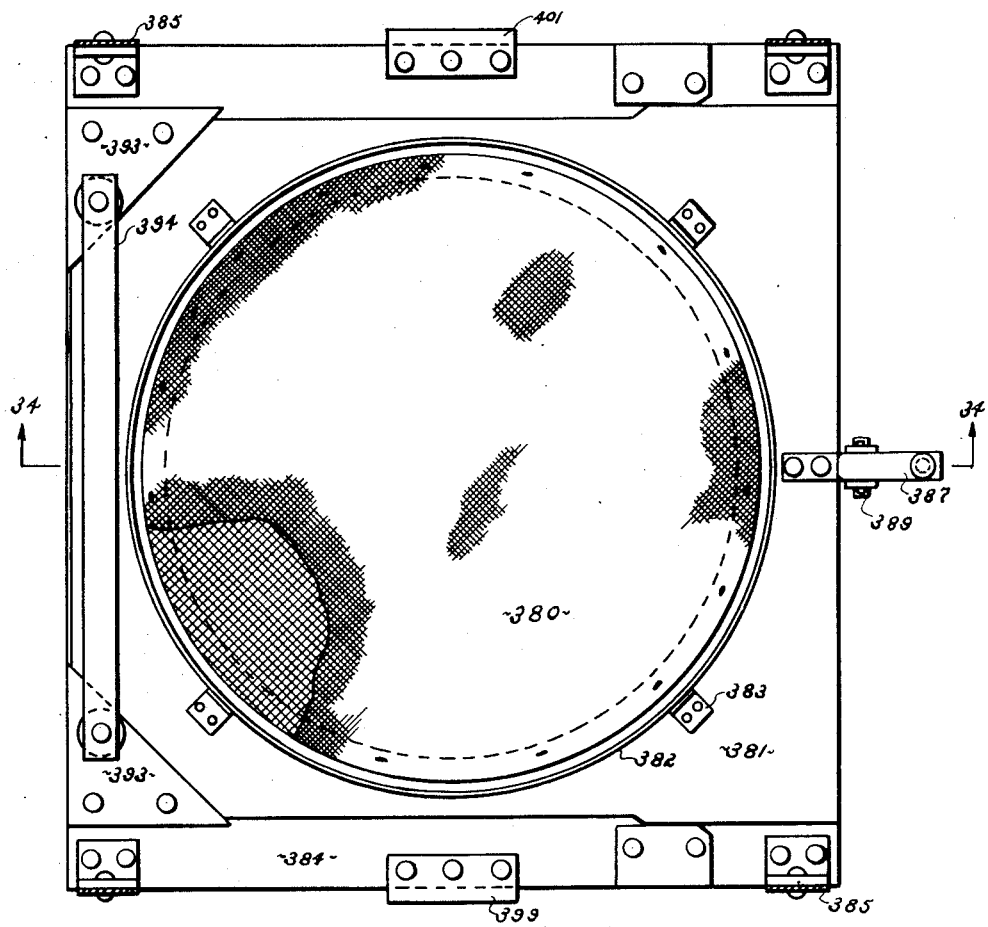
Figure 33 is a view taken on line 33—33, Figure 31.
Figure 34:
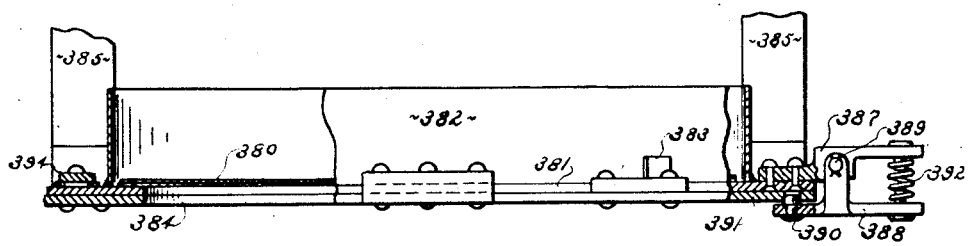
Figure 34 is a view taken on line 34—34, Figure 33.

After the piece of ware has been dusted, it is advanced one step into registration with an inclined discharge spout 410, Figure 31, the upper end of which is arranged in proximity to a pulley 411 mounted on a shaft 412 journalled at its ends in bearings 413, Figure 32. A similar pulley 414 is mounted upon a shaft 415 journalled at one end in a bearing 416 with the opposite end portion journalled in a bearing 417 through which the shaft extends. A disk 418 is mounted on this end of the shaft and is connected thereto through a ratchet mechanism 419. An endless belt 420 is trained over the pulleys 411, 414, with the upper run of the belt traveling beneath the elongated slot 372 formed in the bottom wall of the hopper. The upper run of the belt is intermittently advanced toward the upper end of the discharge spout 410, see Figure 31. This movement is imparted to the belt by a solenoid 422 connected to the disk 418 by a link 423. When the solenoid is energized, its plunger moves the link 423 upwardly and through the ratchet mechanism 419 the pulley 414 is moved in a counter-clockwise direction, Figure 31. The plunger and disk 418 are returned by the tension spring 424. The movement of the disk 418 is controlled by adjustable stop screws 425.

Figure 30:
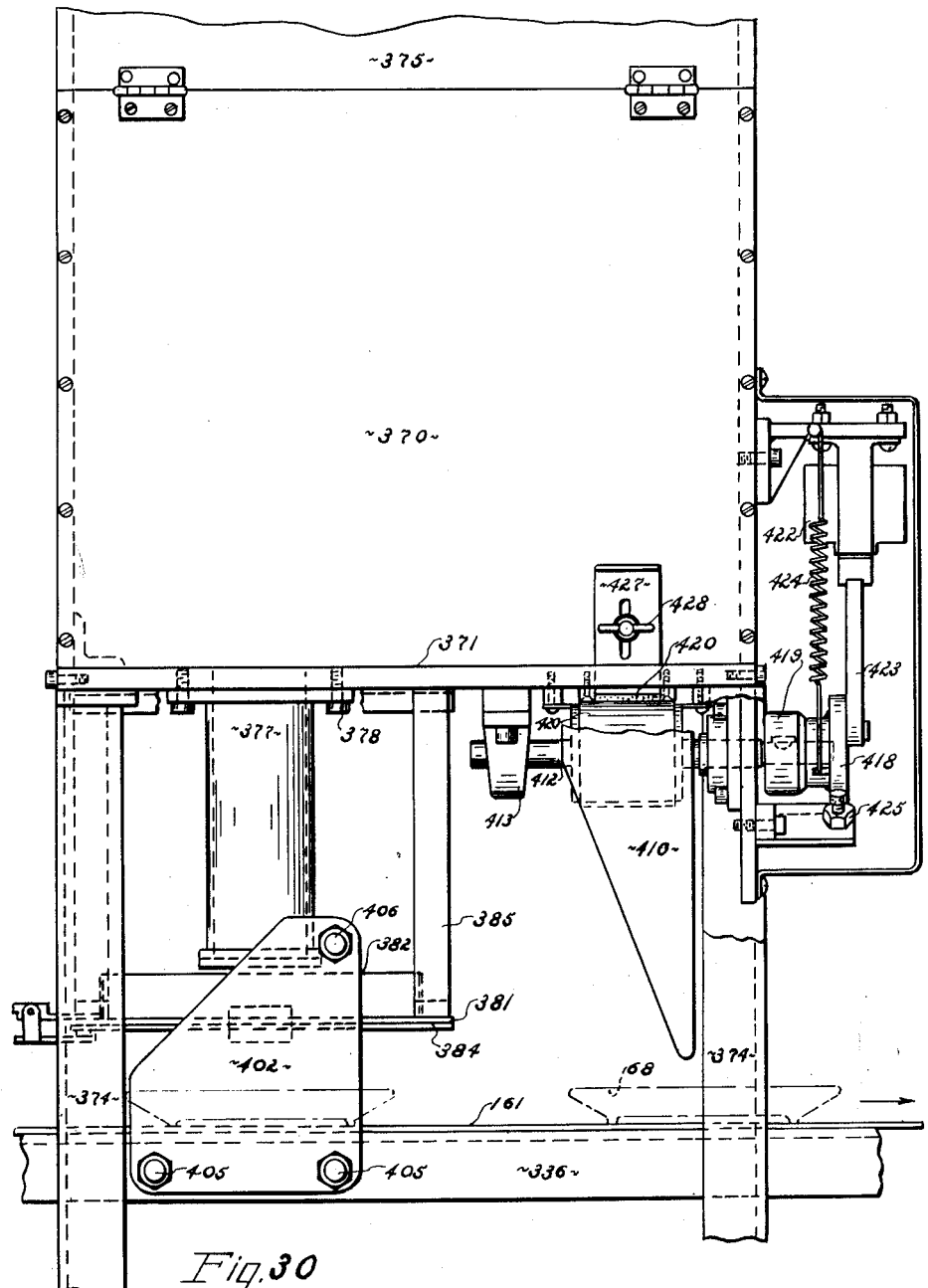
Figure 30 is a side elevational view of the dusting and cobbing apparatus.

The belt 420 accordingly advances a layer of the granular material indicated at 426, and the thickness of this layer is determined by a gate 427, Figure 30, mounted on the front side of the hopper and being adjustable vertically to move the lower edge of the gate toward and from the upper run of the belt in proximity to the pulley 411. The gate is held in adjusted position by a thumb nut 428. As the granular material 426 is discharged into the spout 410, it moves by gravity to form a small pile or cob indicated at 429, Figure 31, in the center of each piece of ware. The amount of material so deposited is controlled by the extent of movement of the disk 418 and by the adjustment of the gate 427.

The solenoids 400, 422, are energized by switches 430, 431, Figure 24, respectively. These switches are mounted upon the plate 356, Figures 24, 25, supporting the drive mechanism for the discharge conveyor. These switches are closed by a pin 432 carried on a disk 433 affixed to the output shaft 343 of the gear reducing unit 341. The arrangement is such that the switches 430, 431, are closed after each advancement of the conveyor belt 151 and before the next advancement.

Figure 6:
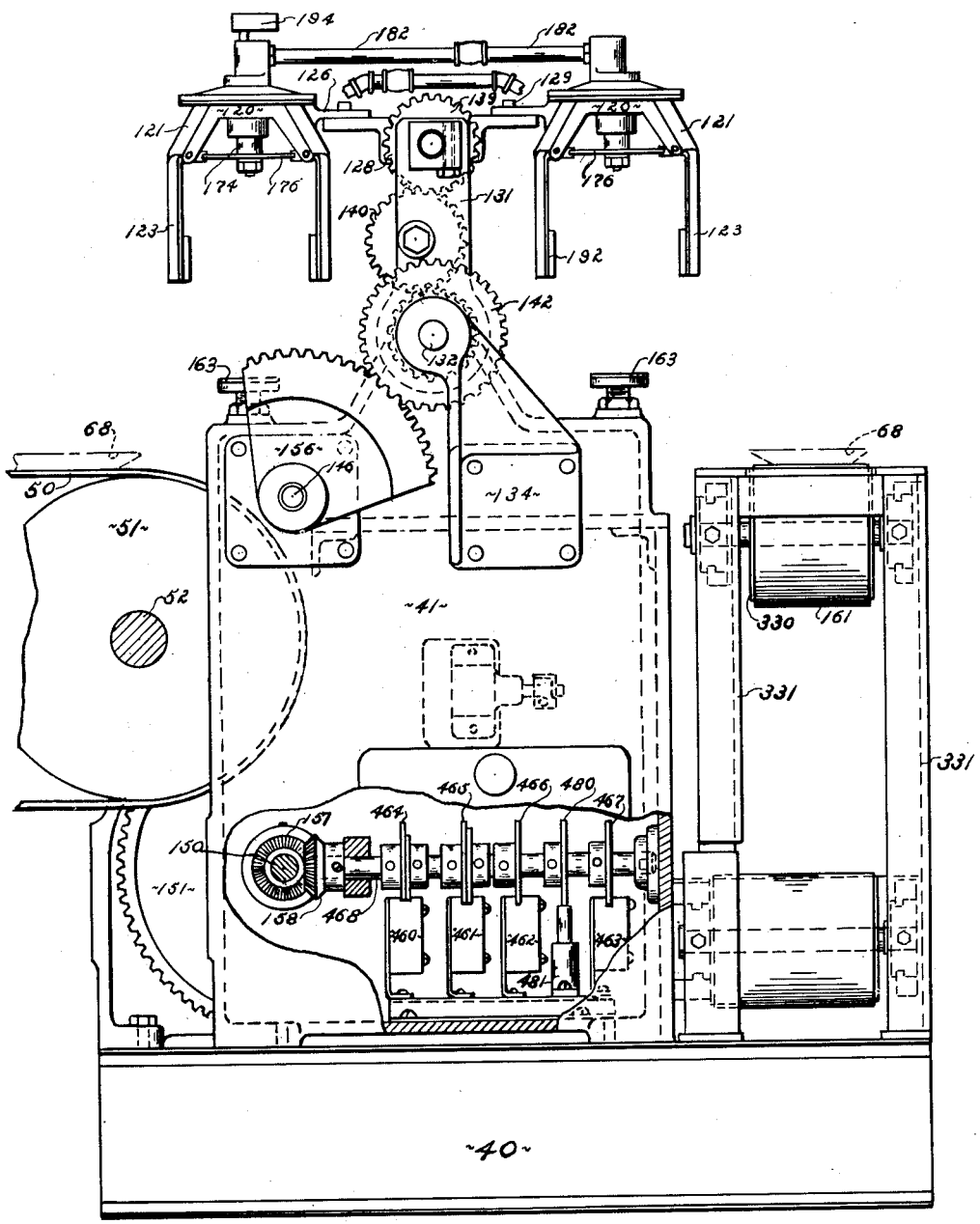
Figure 6 is an end elevational view looking to the right, Figure 1, with parts broken away.

The various operations performed by the machine are controlled by a series of switches 450, 451, 452, 453, Figure 12, which are actuated by cams 454, 455, 456 and 457, respectively, mounted on a shaft 458, and by a second group of switches 460, 461, 462, 463, Figure 6, operated by cams 464, 465, 466 and 467, respectively. These latter cams are mounted on a cam shaft 468 driven from the shaft 150 through beveled gears 157, 158, Figure 6.

The cam shaft 458 controlling the switches 450—453 is journalled in bearings 469, 470, mounted outside the frame structure of the machine, see Figure 12. This shaft 458 may be driven by a motor 471 through a gear reduction 472 and a chain 473 or, it may be driven from a shaft 474 extending from the jigger or ware forming machine through an over-running clutch or ratchet mechanism. As shown in Figures 12 and 13, a sprocket 475 is rotatably journalled upon the shaft 474 and carries a pawl 476 urged into a notch formed in a driving collar 477 secured to the shaft, as by set screws 478, the sprocket 475 being operatively connected to a sprocket affixed to the cam shaft by means of a chain 479. In either event, the shaft 458 is rotated one revolution for the production of six pieces of ware by the ware forming machine, or one revolution for the formation of the number of pieces of ware arranged on each row on the in-feed conveyor belt 50.

Assuming that a row of ware has been advanced by the belt 50 into juxtaposition with the cabinet portion of the machine, cam 457 actuates switch 453 completing an energizing circuit for the transfer motor 154. This motor actuates the transfer mechanism to move the ware transfer members 121 on the side of the machine toward the in-feed conveyor 50 into registration with the pieces of ware on the conveyor. As the lower ends of the fingers 123 are positioned about the pieces of ware, a cam 480 actuates an air valve 481, Figure 6, which, in turn, operates the four-way valve 185 to admit air to the header 183 and through the conduits 184 to the under side of the diaphragm 170, causing the stem 174 to move upwardly and the fingers 123 to move inwardly and grasp the rim of the pieces of ware. The transfer members are then moved upwardly and laterally to position the pieces of ware on the turn-tables 78, at which time the cam 480 again actuates the valve 481 to effect operation of the valve 185 to exhaust the air from the under side of the diaphragms 170 and to apply air on the upper side thereof, causing the fingers 123 to move outwardly and release the pieces of ware. Simultaneously with this latter operation, cam 466 actuates switch 462 to energize the main vacuum valve 114, Figure 8, to supply vacuum to the header 110 and to the turn-table spindles 80 through the individual valves 111. However, as previously explained, if when a transfer member arrives in juxtaposition to a turn-table it does not have a piece of ware, the step 168 has opened switch 194 and these switches are connected in series with the respective individual solenoids 112. With this arrangement, vacuum is supplied to each spindle on the turn-table on which there has been deposited a piece of ware.

Immediately upon the application of vacuum to the spindle, cam 456, Figure 12, actuates switch 452 to energize the spindle drive motor 93 for a predetermined period of time and during rotation of the spindles, cam 455 actuates switch 451 which, in turn, effects operation of a four-way solenoid operated air valve, not shown, and which functions to apply air pressure to the cylinders 252 to cause the pistons therein to move inwardly and to effect similar movement of the bar 251, Figure 7, which permits the trimming tools to move inwardly into engagement with the edge of the ware under the influence of the springs 246. At the duration of the trimming operation, the mechanism just described functions to apply air on the opposite sides of the pistons in the cylinders 252 to move the bar 251 outwardly and to move the trimming tools out of engagement with the ware, whereupon the cam 456 and switch 452 controlled thereby open the circuit to the spindle motor 93.

The cam 467 actuates switch 463 controlling the circuit to the main vacuum valve 114 to cause this valve to disconnect the source of vacuum to the header 110 and to connect the latter to atmosphere as soon as the spindle turn-tables 78 have stopped rotating.

Previous to the energization of motor 93, the transfer motor 154 continued its operation and moved the transfer members to the upper rest position disclosed in Figures 5 and 6. The motor 154 is stopped with the transfer members in this position with the actuation of switch 460 by cam 464. During rotation of the spindles 80, switch 450 is closed by cam 454, furnishing a circuit to motor 70, causing the conveyor 50 to advance one step by means of the Geneva drive described in connection with Figure 27. At the end of this movement, the motor circuit is opened by switch 490 actuated by a cam 491 associated with the Geneva crank 74, see Figure 27. This advancement of the conveyor 50 brings another row of ware into juxtaposition with the cabinet portion of the machine. Also during the trimming operation, the discharge or outgoing conveyor 161 has been actuated seven successive steps forwardly. The motor 340 for actuating this conveyor is initially energized by actuation of switch 461 by cam 465, and the motor runs continuously to effect seven revolutions of the shaft 343, as previously described, at which time the circuit to the motor is opened by the switch 349, Figure 24. The machine functions in repetition of the cycle just described, whereby the air dried ware is automatically placed upon the turn-table 78, the edge of the ware fettled, the fettled ware automatically transferred to the conveyor 161 and as it is advanced from the machine by that conveyor, it is automatically dusted and cobbed.

What I claim is:

1. A machine for finishing articles of pottery ware comprising a frame, an in-feed conveyor operable to advance successively rows of unfired ware, an out-feed conveyor, a plurality of spindles arranged intermediate said conveyors and journalled for vertical rotation in the frame, ware transfer mechanism operable to transfer the pieces of ware in a row from said in-feed conveyor to said spindles and to subsequently transfer the pieces of ware from said spindles to said out-feed conveyor, means operable to effect rotation of said spindles with the pieces of ware thereon for a predetermined period, a fettling tool movable into engagement with the rim of each piece of ware positioned on said spindles during rotation thereof, actuating means cooperable during the fettling operation to advance said out-feed conveyor intermittently to move the pieces of ware thereon to and past a cobbing station, and means arranged at said station and operable to deposit a quantity of granulated material on each piece of ware.

2. Apparatus for finishing articles of unfired pottery ware preparatory to firing comprising a frame, a plurality of spindles journalled in the frame and adapted to rotate pieces of ware, a conveyor operable to advance pieces of unfired ware toward said spindles, an out-feed conveyor operable to advance pieces of ware from said spindles, ware transfer members movably mounted in the frame and operable to successively transfer pieces of ware from said first conveyor to said spindles, and from said spindles to said out-feed conveyor, ware trimming mechanism operable to trim the pieces of ware during rotation thereof by said spindles, actuating means cooperable during the trimming operation to advance said out-feed conveyor intermittently to successively move the pieces of ware thereon to and past the dusting and cobbing stations, and means arranged at said stations respectively and operable to dust and cob the trimmed pieces of ware advanced by said out-feed conveyor.

3. Apparatus for preparing green pottery ware for firing comprising a frame, an in-feed conveyor operable to advance pieces of ware arranged in rows extending transversely of the conveyor, an out-feed conveyor extending and being movable in a direction parallel to said rows, a plurality of spindles journalled vertically in the frame and arranged in a row medial of said conveyors and extending parallel to said out-feed conveyor, a carrier mounted for movement transversely of each spindle, a pair of ware transfers mounted on each carrier and spaced apart so when one transfer is positioned in registration with a spindle, the other transfer of the pair is arranged in juxtaposition to one of said conveyors, each of said transfers having a plurality of depending fingers movable into and out of engagement with the pieces of ware, power means for intermittently actuating said conveyors, carrier moving means operable during the dwell period of said conveyors to move said carriers to first position the transfers in registration with pieces of ware on said in-feed conveyor and said spindles, and to thence move said carriers in opposite direction to position said transfers in registration with said spindles and said out-feed conveyor, fluid actuated means operable to cause said fingers to engage the pieces of ware at said first position and to release the pieces of ware at the end of said second movement, means operable to effect rotation of said spindles during a portion of the time pieces of ware are positioned thereon, trimming means operable to trim the rim of the pieces of ware during rotation of said spindles.

4. Apparatus for conditioning unfired articles of pottery ware preparatory to firing comprising a frame, a series of spindles journalled vertically in the frame and arranged in a row, a dusting apparatus and a cobbing apparatus operable to dust and cob respectively pieces of ware presented thereto, a conveyor mounted in the frame in juxtaposition to and extending parallel with said row of spindles and operable to intermittently advance a single line procession of pieces of ware to and past said cobbing and dusting apparatus, an in-feed conveyor operable to successively present rows of ware at a transfer point with the pieces of ware in each row in approximate alinement with said spindles, a carrier movable in a vertical arcuate path above each of said spindles and having a pair of spaced apart ware gripping members, motion transmitting means operable to move said carriers toward the in-feed conveyor to position said ware gripping members in registration with pieces of ware on said conveyor and pieces of ware on said spindles respectively, and to thereafter effect reverse movement of said carriers to effect transfer of pieces of ware from said spindles to said first conveyor, and from the in-feed conveyor to said spindles, a fettling tool movable into engagement with the edge of the piece of ware on each of said spindles during rotation thereof, and actuating mechanism operable to effect movement of said conveyors, fettling tool and transfer carriers in timed relation.

5. Apparatus for trimming unfired flat articles of pottery ware comprising an in-feed conveyor, an out-feed conveyor, a plurality of spindles journalled vertically and arranged in a row medial of said conveyors, a support extending lengthwise above said row of spindles, a carrier mounted on said support and extending transversely thereof above each spindle, a ware gripping mechanism mounted on each end of said carriers, the mechanisms on each carrier being spaced apart a distance equal to the spacing between said spindle and either of said conveyors, said support being movable through an arcuate path on an axis extending parallel to said row of spindles and intersecting the axes thereof, power operated means operable to move said support about said axis in one direction to position one ware gripping mechanism of each pair in position to grip a piece of ware on said in-feed conveyor and simultaneously position the other mechanism of each pair in position to grip a piece of ware on a spindle and to cause reverse movement of said support through said path to transfer said pieces of ware to the spindles and out-feed conveyor respectively, and means operable to cause said gripping mechanisms to grip the pieces of ware at the end of said first movement and to release the pieces of ware at the end of said second movement.

6. In apparatus for handling articles of unfired flat pottery ware, a vertically journalled spindle having a turn-table mounted on its upper end, a conveyor for advancing pieces of ware successively towards said spindle, a ware transfer member movable laterally into registration with a piece of ware positioned on the conveyor and thence in reverse direction to transfer the piece of ware to said turn-table, said transfer being provided with a series of depending ware engaging fingers, means operable at the end of said first movement to cause said fingers to grip the edge of the piece of ware and to release the piece of ware upon transfer of said piece of ware to said turn-table, means operable to establish a vacuum between said turn-table and a piece of ware deposited thereon, and means cooperable upon failure of said fingers to grip a piece of ware positioned on the conveyor to prevent the application of vacuum.

7. Apparatus for finishing articles of unfired pottery ware comprising a frame, a plurality of spindles journalled in the frame and arranged in a row, means operable to effect rotation of said spindles with pieces of ware thereon for a predetermined period, a fettling tool movable into engagement with the rim of each piece of ware positioned on said spindles during rotation thereof, dusting and cobbing mechanisms operable when actuated to dust and cobb pieces of ware presented thereto, an out-feed conveyor operable to advance pieces of ware in a direction from said spindles and present the pieces of ware to said dusting and cobbing mechanisms, a ware transfer member arranged above each of said spindles, means operable to move said transfer members simultaneously, and said members being operable upon such movement to transfer pieces of ware from said spindles to said out-feed conveyor, and motion transmitting means operable to actuate said fettling tools, ware transfer members, out-feed conveyor, dusting and cobbing mechanisms, and to effect rotation of said spindles in timed relation.

8. Apparatus for handling articles of unfired flat pottery ware, a vertically journalled spindle having a turn-table mounted at its upper end, a conveyor for advancing pieces of ware successively toward said spindle, a ware transfer member movable laterally into registration with a piece of ware positioned on the conveyor and thence in reverse direction to transfer the piece of ware to said turn-table, said transfer being provided with an annular series of depending ware engaging fingers, means operable at the end of said first movement to cause said fingers to move radially inwardly to grip a piece of ware, and to move radially outwardly to release the piece of ware upon transfer of said piece to said turn-table, means including an electro-responsive device operable to establish a vacuum between said turn-table and a piece of ware deposited thereon, a switch mounted on said transfer and connected in circuit with said electro-responsive device and being cooperable therewith upon inward radial movement of said fingers in the absence of a piece of ware positioned on said conveyor to prevent the application of said vacuum.

EUGENE G. ARELT.

REFERENCES CITED

The following references are of record in the file of this patent:

UNITED STATES PATENTS

| Number | Name | Date |
| --- | --- | --- |
| 1,551,728 | Burger | Sept. 1, 1925 |
| 1,602,122 | Reed | Oct. 5, 1926 |
| 1,859,956 | Canfield | May 24, 1932 |
| 1,933,226 | Smith et al. | Oct. 31, 1933 |
| 2,080,418 | Gould | May 18, 1937 |
| 2,087,877 | Ralston et al. | July 20, 1937 |
| 2,109,028 | Miller | Feb. 22, 1938 |
| 2,187,836 | Miller | Jan. 23, 1940 |
| 2,229,800 | Dean | Jan. 28, 1941 |
| 2,258,658 | Miller | Oct. 14, 1941 |
| 2,332,058 | Cattonai et al. | Oct. 19, 1943 |
| 2,359,879 | Schweitzer | Oct. 10, 1944 |
| 2,469,229 | Gould | May 3, 1949 |
| 2,499,602 | Miller | Mar. 7, 1950 |
| 2,506,378 | Miller | May 2, 1950 |
| 2,510,678 | Bower | June 6, 1950 |